US012657122B2

(12) United States Patent
LeMay

(10) Patent No.: US 12,657,122 B2
(45) Date of Patent: Jun. 16, 2026

(54) CIRCUITRY AND METHODS FOR IMPLEMENTING NON-REDUNDANT METADATA STORAGE ADDRESSED BY BOUNDED CAPABILITIES

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/558,400

(22) Filed: Dec. 21, 2021

(65) Prior Publication Data

US 2023/0195614 A1 Jun. 22, 2023

(51) Int. Cl.
*G06F 12/02* (2006.01)
*G06F 9/30* (2018.01)

(52) U.S. Cl.
CPC ...... *G06F 12/0238* (2013.01); *G06F 9/30101* (2013.01); *G06F 9/3016* (2013.01)

(58) Field of Classification Search
CPC ............. G06F 12/1441; G06F 9/30043; G06F 12/0238; G06F 9/30101; G06F 9/3016;
(Continued)

(56) References Cited

U.S. PATENT DOCUMENTS 3,916,385 A 10/1975 Parmar et al.
4,809,160 A 2/1989 Mahon et al.
(Continued)

FOREIGN PATENT DOCUMENTS

EP 0428079 A2 5/1991
EP 3446222 A1 2/2019
(Continued)

OTHER PUBLICATIONS

Toader, Elena Lidia, European Search Report, May 12, 2023, EP 22204888, European Patent Office, pp. 1-2 (Year: 2023).*
(Continued)

*Primary Examiner* — Arpan P. Savla
(74) *Attorney, Agent, or Firm* — NICHOLSON DE VOS WEBSTER & ELLIOTT LLP

(57) ABSTRACT

Systems, methods, and apparatuses for implementing non-redundant metadata storage addressed by bounded capabilities are described. In certain examples, a hardware processor core comprises an execution circuit to generate a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed; and a capability management circuit to determine a first location of a corresponding first metadata field in the memory based on the bounds field of the first capability, proceed with the first memory access request in response to a match of metadata in the single metadata field of the first capability against metadata at the corresponding first metadata field in the memory, determine a second location of a corresponding second metadata field in the memory based on the bounds field of the second capability, and proceed with the second memory access request in response to a match of metadata in the single metadata field of the second capability against metadata at the corresponding second metadata field in the memory.

24 Claims, 22 Drawing Sheets

(58) Field of Classification Search
CPC .... G06F 12/04; G06F 12/1416; G06F 12/023;
G06F 9/30098
See application file for complete search history.

(56) References Cited

U.S. PATENT DOCUMENTS

| | | | |
|---|---|---|---|
| 4,821,169 A | 4/1989 | Sites et al. | |
| 5,809,564 A | 9/1998 | Craze et al. | |
| 6,009,503 A | 12/1999 | Liedtke | |
| 6,048,940 A | 4/2000 | Blaedel et al. | |
| 6,671,699 B1 | 12/2003 | Black et al. | |
| 6,694,450 B1 | 2/2004 | Kidder et al. | |
| 6,823,433 B1 | 11/2004 | Barnes et al. | |
| 7,401,234 B2 | 7/2008 | Case et al. | |
| 8,554,984 B2 | 10/2013 | Yano et al. | |
| 8,595,442 B1 | 11/2013 | James-Roxby et al. | |
| 9,026,866 B2 | 5/2015 | Balasubramanian | |
| 9,390,031 B2 | 7/2016 | Durham et al. | |
| 9,436,847 B2 * | 9/2016 | Durham .................... | G06F 9/34 |
| 9,652,375 B2 | 5/2017 | Stark et al. | |
| 10,162,694 B2 | 12/2018 | Stark et al. | |
| 2004/0031030 A1 | 2/2004 | Kidder et al. | |
| 2004/0158775 A1 | 8/2004 | Shibuya et al. | |
| 2005/0193217 A1 | 9/2005 | Case et al. | |
| 2006/0187941 A1 | 8/2006 | Andersen | |
| 2006/0256877 A1 | 11/2006 | Szczepanek et al. | |
| 2006/0256878 A1 | 11/2006 | Szczepanek et al. | |
| 2007/0055837 A1 | 3/2007 | Rajagopal et al. | |
| 2008/0209282 A1 | 8/2008 | Lee et al. | |
| 2009/0271536 A1 | 10/2009 | Tiennot | |
| 2009/0292977 A1 | 11/2009 | Bradley et al. | |
| 2010/0162038 A1 | 6/2010 | Hulbert et al. | |
| 2013/0318322 A1 | 11/2013 | Shetty et al. | |
| 2013/0326288 A1 | 12/2013 | Datta et al. | |
| 2014/0115283 A1 | 4/2014 | Radovic et al. | |
| 2014/0281354 A1 | 9/2014 | Tkacik et al. | |
| 2014/0372698 A1 | 12/2014 | Lee et al. | |
| 2016/0048378 A1 | 2/2016 | Varma | |
| 2016/0124802 A1 | 5/2016 | Gabor et al. | |
| 2016/0259682 A1 | 9/2016 | Stark et al. | |
| 2016/0283300 A1 | 9/2016 | Stark et al. | |
| 2016/0371139 A1 | 12/2016 | Stark et al. | |
| 2017/0177429 A1 * | 6/2017 | Stark ......................... | G06F 9/38 |
| 2018/0060250 A1 | 3/2018 | Hildesheim et al. | |
| 2018/0074715 A1 | 3/2018 | Farmahini-Farahani et al. | |
| 2019/0095389 A1 * | 3/2019 | Barnes ................ | G06F 9/30105 |
| 2020/0004953 A1 | 1/2020 | Lemay et al. | |
| 2021/0026773 A1 | 1/2021 | Smith | |
| 2021/0200546 A1 | 7/2021 | Lemay et al. | |
| 2023/0195614 A1 | 6/2023 | LeMay | |

FOREIGN PATENT DOCUMENTS

| | | | | |
|---|---|---|---|---|
| GB | 2572151 A | * | 9/2019 | ......... G06F 12/0875 |
| JP | 03-244054 A | | 10/1991 | |
| WO | 2007/079011 A3 | | 11/2007 | |

OTHER PUBLICATIONS

Advisory Action from U.S. Appl. No. 11/323,446, Apr. 17, 2012, 3 pages.

Angelo-Oracle. "SPARC M7 Chip-32 cores", Oracle.com, Aug. 15, 2014. Web. Accessed Dec. 21, 2015. 8 pages. URL: <http://blogs.oracle.com/rajadurai/entry/sparc_m7_chip_32_cores>.

Arm, "Arm® Architecture Reference Manual Supplement Morello for A-profile Architecture", Document No. DDI0606, Document Version: A.j, 2019-2021, 1288 pages.

Biin: "CPA Architecture Reference Manual", 1988, 401 pages.

Burow et al., "CUP: Comprehensive User-Space Protection for C/C++", Session 9: Software Security, ASIACCS'18, Jun. 4-8, 2018, pp. 381-392.

Carr et al., "DataShield: Configurable Data Confidentiality and Integrity", Asia CCS '17, Apr. 2-6, 2017, pp. 193-204.

Chen et al., "Shreds: Fine-grained Execution Units with Private Memory", IEEE Symposium on Security and Privacy, 2016, pp. 56-71.

Cheri, "Capability Hardware Enhanced RISC Instructions (CHERI)", available online at <https://www.cl.cam.ac.uk/research/security/ctsrd/cheri/>, 2010-2019, 2 pages.

Dartmouth, "ELFbac: Runtime Intent-Level ABI-Granular Memory Protection for Linux", available online at <https://www.cs.dartmouth.edu/~sergey/io/elfbac/>, retrieved on May 1, 2020, 1 page.

Duarte, "Memory Translation and Segmentation" Aug. 2008, p. 1-7.

Duck et al., "EffectiveSan: Type and Memory Error Detection using Dynamically Typed C/C++", PLDI'18, Jun. 18-22, 2018, pp. 181-195.

Final Office Action from U.S. Appl. No. 11/323,446, Dec. 30, 2011, 18 pages.

Final Office Action from U.S. Appl. No. 11/323,446, Jan. 17, 2013, 17 pages.

Final Office Action from U.S. Appl. No. 11/323,446, Jul. 16, 2015, 17 pages.

Final Office Action from U.S. Appl. No. 11/323,446, Jul. 28, 2014, 16 pages.

Final Office Action from U.S. Appl. No. 11/323,446, Jul. 7, 2009, 21 pages.

Final Office Action from U.S. Appl. No. 11/323,446, Oct. 15, 2010, 17 pages.

Final Office Action from U.S. Appl. No. 11/323,446, Sep. 20, 2013, 14 pages.

Gil et al., "There's a Hole in the Bottom of the C: On the Effectiveness of Allocation Protection", IEEE Cybersecurity Development (SecDev), Sep. 30-Oct. 2, 2018, 8 pages.

Gove, D., et al., "Detecting memory access errors," Nov. 25, 2015, 17 pages.

Gretton-Dann et al., "Arm A-Profile Architecture Developments 2018: Armv8.5-A", available online at <https://community.arm.com/developer/ip-products/processors/b/processors-ip-blog/posts/arm-a-profile-architecture-2018-developments-armv85a>, Sep. 17, 2018, 5 pages.

https://courses.cs.washington.edu/courses/cse351/17wi/lectures/CSE351-L02-memory-L17wi.pdfAuthor: Ceze; Title: CSE351:Memory, Data, & Addressing I, Date: Winter, 2017 (Year: 2017).

Intel, "Intel 64 and IA-32 Architectures Software Developer's Manual", vol. 3A, System Programming Guide, Part 1, Order No. 253668-060US, Sep. 2016, 468 pages.

International Preliminary Report on Patentability for Application No. PCT/US2006/048940, Jul. 1, 2008, 8 pages.

International Search Report and Written Opinion for Application No. PCT/US2006/048940, Sep. 25, 2007, 15 pages.

International Search Report and Written Opinion for Application No. PCT/US2016/063211, Mar. 7, 2017, 11 pages.

Introduction to Sparc M7 and Silicon Secured Memory (SSM), Retrieved from https://swisdev.oracle.com/_files/What-Is-SSM.html on Jul. 4, 2016, 2 pages.

Jeon et a., "HexType: Efficient Detection of Type Confusion Errors for C++", CCS '17, Session K3: Program Analysis, Oct. 2017, pp. 2373-2387.

Kwon et al., "Low-Fat Pointers: Compact Encoding and Efficient Gate-Level Implementation of Fat Pointers for Spatial Safety and Capability-based Security", Proceedings of the 2013 ACM SIGSAC Conference on Computer & Communications Security, 2013, pp. 721-732.

Liljestrand et al., "PAC it up: Towards Pointer Integrity using ARM Pointer Authentication", Cornell University, Nov. 22, 2018, 21 pages.

LogMeIn Support, "What is Privilege Separation in SSH?", available online at <https://web.archive.org/web/20191218064501/https://help.logmein.com/articles/en_US/FAQ/What-is-Privilege-Separation-in-SSH-en1>, Dec. 18, 2019, 1 page.

M. Rutland, "ARMv8.3 Pointer Authentication",, Linux Security Summit, Sep. 14, 2017, 24 slides.

Mahon M.J., et al., "Hewlett-Packard Precision Architecture: The Processor," Hewlett-Packard Journal, Aug. 1986, 19 pages.

(56) References Cited

OTHER PUBLICATIONS

McIlroy et al., "Spectre is Here to Stay: An Analysis of Side-Channels and Speculative Execution", Cornell University, Feb. 15, 2019, pp. 1-26.

Menon et al., "Shakti-T: A RISC-V Processor with Light Weight Security Extensions", Conference: the Hardware and Architectural Support for Security and Privacy, Jun. 25, 2017, 9 pages.

Miller, Matt, "Trends, Challenges, and Strategic Shifts in the Software Vulnerability Mitigation Landscape", Microsoft Security Response Center (MSRC), Feb. 7, 2019, 32 pages.

Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.

Nagarakatte et al., "CETS: Compiler-Enforced Temporal Safety for C", ISMM'10, Jun. 5-6, 2010, pp. 31-40.

Non-Final Office Action from U.S. Appl. No. 11/323,446, Apr. 23, 2010, 16 pages.

Non-Final Office Action from U.S. Appl. No. 11/323,446, Jan. 15, 2015, 18 pages.

Non-Final Office Action from U.S. Appl. No. 11/323,446, Jun. 22, 2012, 16 pages.

Non-Final Office Action from U.S. Appl. No. 11/323,446, Jun. 7, 2013, 18 pages.

Non-Final Office Action from U.S. Appl. No. 11/323,446, Mar. 15, 2011, 16 pages.

Non-Final Office Action from U.S. Appl. No. 11/323,446, Mar. 20, 2014, 15 pages.

Non-Final Office Action from U.S. Appl. No. 11/323,446, Nov. 5, 2015, 5 pages.

Non-Final Office Action from U.S. Appl. No. 11/323,446, Oct. 7, 2008, 17 pages.

Non-Final Office Action, U.S. Appl. No. 16/729,358, Sep. 16, 2020, 17 pages.

Notice of Allowance from U.S. Appl. No. 11/323,446, Mar. 14, 2016, 5 pages.

Notice of Allowance, U.S. Appl. No. 16/729,358, Jul. 6, 2021, 8 pages.

Qualcomm, "Pointer Authentication on ARMv8.3: Design and Analysis of the New Software Security Instructions", Jan. 2017, 12 pages.

Serebryany et al., "AddressSanitizer: A Fast Address Sanity Checker", 2012 Usenix Annual Technical Conference, Jun. 13-15, 2012, 10 pages.

Serebryany et al., "Memory Tagging and How it Improves C/C++ Memory Safety", Feb. 2018, 14 pages.

Serebryany et al., "Memory Tagging: How it Improves C/C++ Memory Safety" Google, LLVM Developers' Meeting, Oct. 2018, 29 slides.

Serebryany, Kostya, "Security: ARM Memory Tagging Extension and How it Improves C/C++ Memory Safety", vol. 44, No. 2, Summer 2019, pp. 12-16.

Suh et al., "Secure Program Execution via Dynamic Information Flow Tracking", ASPLOS'04, Oct. 9-13, 2004, pp. 85-96.

T. Nyman et al., "HardScope: Thwarting DOP attacks with Hardware-Assisted Run-time Scope Enforcement", May 2017, pp. 1-20.

The Chromium Projects, "Multi-Process Architecture", available online at <https://web.archive.org/web/20191030200549/https://www.chromium.org/developers/design-documents/multi-process-architecture>, Oct. 30, 2019, 2 pages.

Tsampas et al., "Towards Automatic Compartmentalization of C Programs on Capability Machines", In Proceedings of the International Conference on Foundations of Computer Science, 2017, 14 pages.

Vasilakis et al., "BreakApp: Automated, Flexible Application Compartmentalization", Network and Distributed Systems Security (NDSS) Symposium, Feb. 18-21, 2018, 15 pages.

Watson et al., "An Introduction to CHERI", University of Cambridge, Computer Laboratory, Technical Report, No. 941, Sep. 2019, 43 pages.

Watson et al., "Capability Hardware Enhanced RISC Instructions: CHERI Instruction-Set Architecture (Version 8)", University of Cambridge, Computer Laboratory, Technical Report, No. 951, Oct. 2020, 590 pages.

Watson et al., "CHERI: A Hybrid Capability-System Architecture for Scalable Software Compartmentalization", IEEE Symposium on Security and Privacy, 2015, pp. 20-37.

Watson, "Capsicum: Practical capabilities for UNIX", USENIX Security, 2010, 17 pages.

Wesley et al., "Cornucopia: Temporal Safety for CHERI Heaps", . In Proceedings of the 41st IEEE Symposium on Security and Privacy, 2020, pp. 1507-1524.

Wilkes J., et al., "A Comparison of Protection Lookaside Buffers and the PA-RISC Protection Architecture," Mar. 1992, Hewlett-Packard, 12 pages.

Xia et al., "CHERIvoke: Characterising Pointer Revocation using CHERI Capabilities for Temporal Memory Safety", MICRO '52, Oct. 2019, pp. 545-557.

European Search Report and Search Opinion, EP App. No. 22204888. 6, May 23, 2023, 8 pages.

Intention to Grant, EP App. No. 22204888.6, Oct. 21, 2025, 6 pages.

* cited by examiner

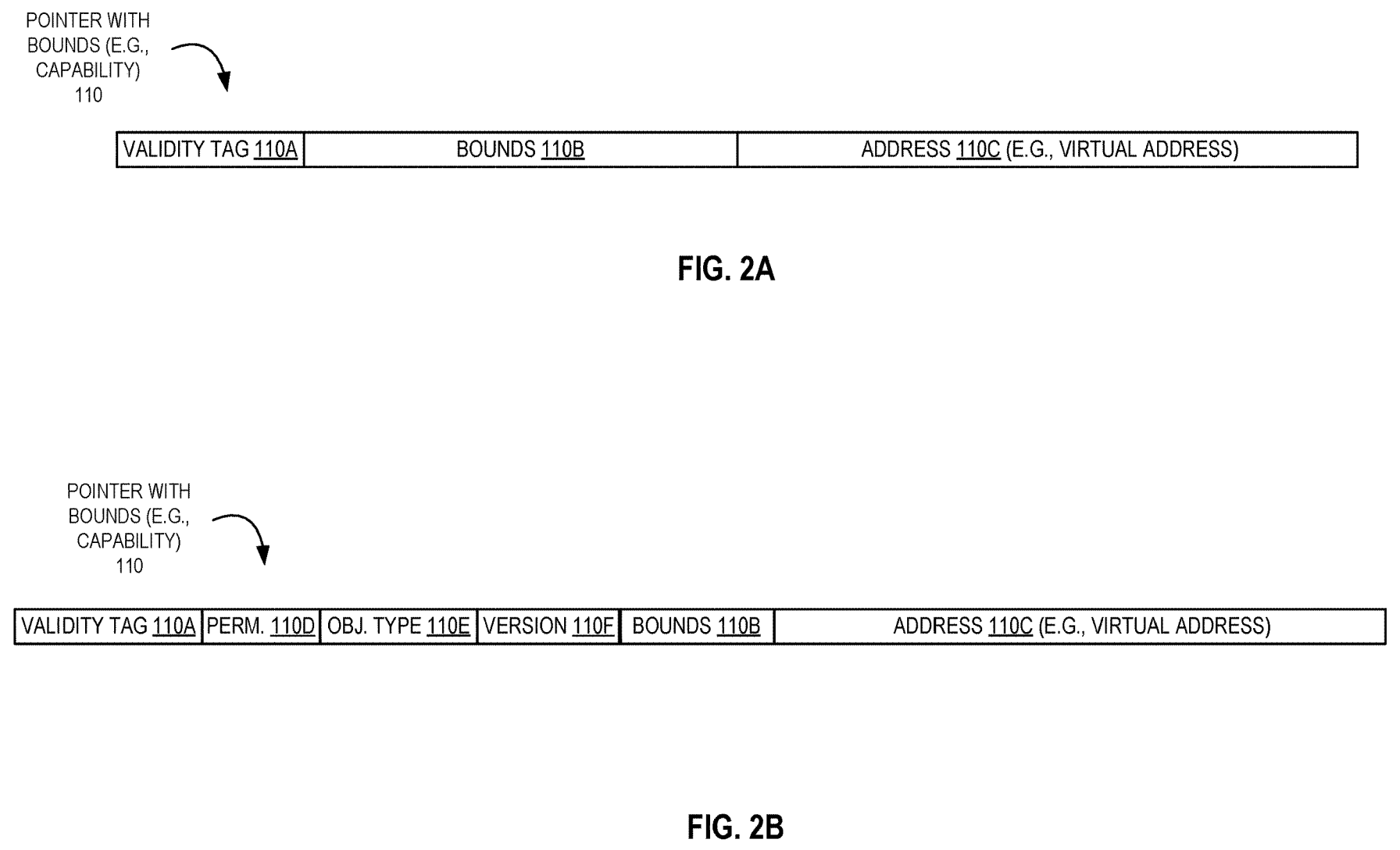

POINTER WITH
BOUNDS (E.G.,
CAPABILITY)
110

| VALIDITY TAG 110A | BOUNDS 110B | ADDRESS 110C (E.G., VIRTUAL ADDRESS) |

FIG. 2A

POINTER WITH
BOUNDS (E.G.,
CAPABILITY)
110

| VALIDITY TAG 110A | PERM. 110D | OBJ. TYPE 110E | VERSION 110F | BOUNDS 110B | ADDRESS 110C (E.G., VIRTUAL ADDRESS) |

FIG. 2B

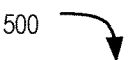

500

```
┌─────────────────────────────────┐
│   HANDLE MEMORY ACCESS REQUEST  │
│               502               │
└─────────────────────────────────┘
                │
                ▼
┌─────────────────────────────────┐
│  COMPUTE BEGINNING OF OBJECT FROM│
│  BOUNDS STORED IN CAPABILITY AND │
│  LOAD METADATA FROM COMPUTED     │
│            LOCATION              │
│               504               │
└─────────────────────────────────┘
                │
                ▼
```

DO THE
SECURITY CHECKS BASED ON THE
METADATA INDICATE THAT THE
ACCESS IS AUTHORIZED?
506

NO   →

```
┌─────────────────────────────────┐
│       GENERATE EXCEPTION        │
│               510               │
└─────────────────────────────────┘
```

YES

```
┌─────────────────────────────────┐
│   PROCEED WITH THE MEMORY ACCESS │
│               508               │
└─────────────────────────────────┘
```

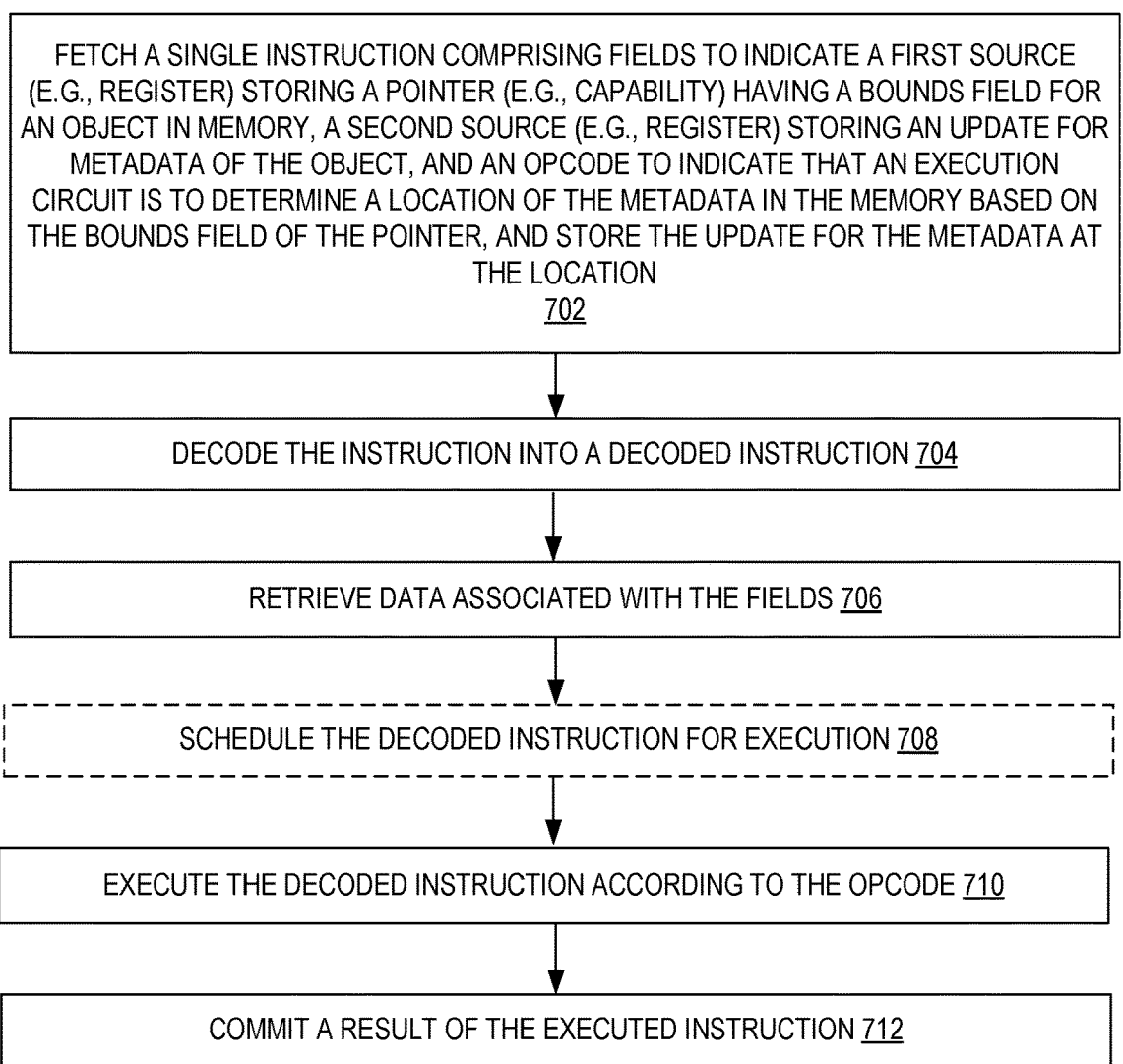

FETCH A SINGLE INSTRUCTION COMPRISING FIELDS TO INDICATE A FIRST SOURCE (E.G., REGISTER) STORING A POINTER (E.G., CAPABILITY) HAVING A BOUNDS FIELD FOR AN OBJECT IN MEMORY, A SECOND SOURCE (E.G., REGISTER) STORING AN UPDATE FOR METADATA OF THE OBJECT, AND AN OPCODE TO INDICATE THAT AN EXECUTION CIRCUIT IS TO DETERMINE A LOCATION OF THE METADATA IN THE MEMORY BASED ON THE BOUNDS FIELD OF THE POINTER, AND STORE THE UPDATE FOR THE METADATA AT THE LOCATION
702

DECODE THE INSTRUCTION INTO A DECODED INSTRUCTION 704

RETRIEVE DATA ASSOCIATED WITH THE FIELDS 706

SCHEDULE THE DECODED INSTRUCTION FOR EXECUTION 708

EXECUTE THE DECODED INSTRUCTION ACCORDING TO THE OPCODE 710

COMMIT A RESULT OF THE EXECUTED INSTRUCTION 712

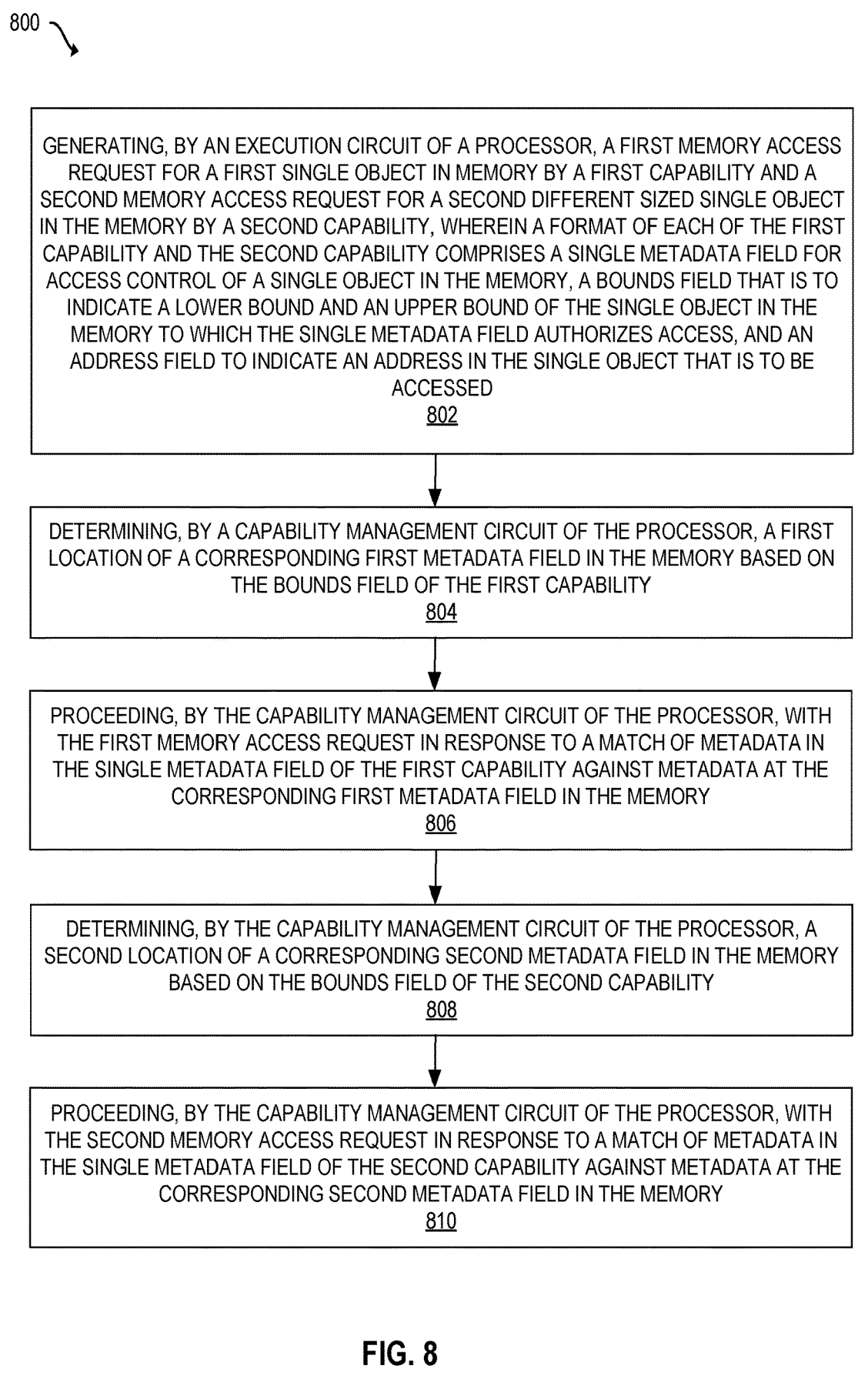

GENERATING, BY AN EXECUTION CIRCUIT OF A PROCESSOR, A FIRST MEMORY ACCESS REQUEST FOR A FIRST SINGLE OBJECT IN MEMORY BY A FIRST CAPABILITY AND A SECOND MEMORY ACCESS REQUEST FOR A SECOND DIFFERENT SIZED SINGLE OBJECT IN THE MEMORY BY A SECOND CAPABILITY, WHEREIN A FORMAT OF EACH OF THE FIRST CAPABILITY AND THE SECOND CAPABILITY COMPRISES A SINGLE METADATA FIELD FOR ACCESS CONTROL OF A SINGLE OBJECT IN THE MEMORY, A BOUNDS FIELD THAT IS TO INDICATE A LOWER BOUND AND AN UPPER BOUND OF THE SINGLE OBJECT IN THE MEMORY TO WHICH THE SINGLE METADATA FIELD AUTHORIZES ACCESS, AND AN ADDRESS FIELD TO INDICATE AN ADDRESS IN THE SINGLE OBJECT THAT IS TO BE ACCESSED
802

DETERMINING, BY A CAPABILITY MANAGEMENT CIRCUIT OF THE PROCESSOR, A FIRST LOCATION OF A CORRESPONDING FIRST METADATA FIELD IN THE MEMORY BASED ON THE BOUNDS FIELD OF THE FIRST CAPABILITY
804

PROCEEDING, BY THE CAPABILITY MANAGEMENT CIRCUIT OF THE PROCESSOR, WITH THE FIRST MEMORY ACCESS REQUEST IN RESPONSE TO A MATCH OF METADATA IN THE SINGLE METADATA FIELD OF THE FIRST CAPABILITY AGAINST METADATA AT THE CORRESPONDING FIRST METADATA FIELD IN THE MEMORY
806

DETERMINING, BY THE CAPABILITY MANAGEMENT CIRCUIT OF THE PROCESSOR, A SECOND LOCATION OF A CORRESPONDING SECOND METADATA FIELD IN THE MEMORY BASED ON THE BOUNDS FIELD OF THE SECOND CAPABILITY
808

PROCEEDING, BY THE CAPABILITY MANAGEMENT CIRCUIT OF THE PROCESSOR, WITH THE SECOND MEMORY ACCESS REQUEST IN RESPONSE TO A MATCH OF METADATA IN THE SINGLE METADATA FIELD OF THE SECOND CAPABILITY AGAINST METADATA AT THE CORRESPONDING SECOND METADATA FIELD IN THE MEMORY
810

FIG. 8

CIRCUITRY AND METHODS FOR IMPLEMENTING NON-REDUNDANT METADATA STORAGE ADDRESSED BY BOUNDED CAPABILITIES

TECHNICAL FIELD

The disclosure relates generally to electronics, and, more specifically, an example of the disclosure relates to circuitry for implementing non-redundant metadata storage addressed by bounded capabilities.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 2A illustrates an example format of a pointer with bounds (e.g., a capability) including a validity tag field, a bounds field, and an address field according to examples of the disclosure.

FIG. 2B illustrates an example format of a pointer with bounds (e.g., a capability) including a validity tag field, a permission field, an object type field, a version field, a bounds field, and an address field according to examples of the disclosure.

FIG. 5 illustrates operations of a method of processing a memory access request for a pointer (e.g., capability) having a bounds field for access control of an object in memory with non-redundant metadata storage according to examples of the disclosure.

FIG. 7 is a flow diagram illustrating operations of a method of processing a set metadata instruction according to examples of the disclosure.

FIG. 8 is a flow diagram illustrating operations of a method of processing a memory access request for a pointer (e.g., capability) having a bounds field and a metadata field for access control of an object in memory with non-redundant metadata storage according to examples of the disclosure.

DETAILED DESCRIPTION

Figure 1:
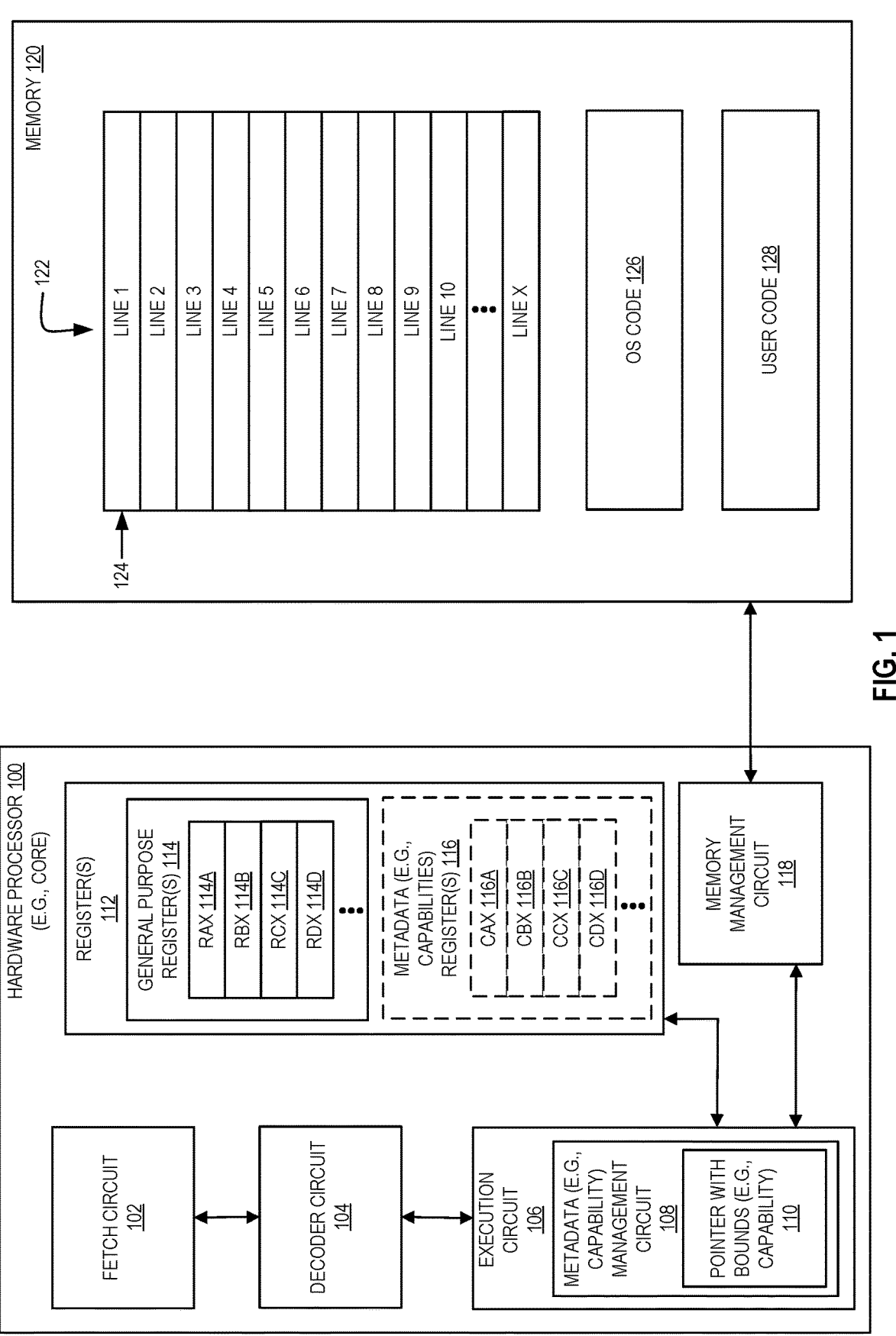
FIG. 1 illustrates a block diagram of a hardware processor including a metadata (e.g., capability) management circuit and coupled to a memory according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Memory may be divided into separate blocks (e.g., one or more cache lines), for example, with each block managed as a unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via metadata included with a pointer.

In certain examples, there are one or more (e.g., many) requirements for storing security metadata or other metadata alongside each allocation (e.g., object) in memory. For example, metadata may include one or more (e.g., any single one or combination of): (i) a tag (or version) number (e.g., used to prevent dangling pointers from accessing memory in a use-after free (UAF) attack), (ii) a bitmap that indicates which portions of an object contain pointers that are to be protected from corruption, (iii) a per-object key that is assigned to uniquely encrypt and/or decrypt each object, (iv) a type identification (ID) that is associated with each object of that specified type, or (v) an ownership ID used to enforce ownership transfer and borrowing (e.g., according to a Rust specification).

In certain examples, security metadata is embedded into an extended (e.g., extended to overflow the available bits in a non-extended pointer (e.g., 64-bit) format) pointer (e.g., capability) (e.g., extended to 128-bits, 192-bits, 256-bits, etc.), such as one that includes permissions, etc. all within an (e.g., 128-bit) extended pointer.

In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples allow unprivileged instructions to create capabilities as well, e.g., where untrusted compartments are not permitted to create capabilities expanding access beyond the capabilities provided to the compartment. Certain examples implement a capability-based addressing scheme by extending the data storage (for example, extending memory (e.g., and register) addressing) with an additional bit (e.g., writable only if permitted by the metadata (e.g., capability) management circuit) that indicates that a particular location is a capability, for example, such that all memory accesses (e.g., loads, stores, and/or instruction fetches) must be authorized by a respective capability or be denied. Example formats of capabilities are discussed below in reference to FIGS. 2A and 2B.

However, it is a challenge to efficiently store the metadata in such a way that it can be accessed (e.g., in a single step) given only a pointer (e.g., address) that may point anywhere within an object, e.g., pointing to a block within multiple blocks of the object. For example, certain metadata is redundantly reproduced for each uniformly sized (e.g., a predetermined size) (e.g., for all allocations) block (e.g., granule) of memory for an object (e.g., with each single block of memory smaller than a single object), e.g., with an example shown in FIG. 3A that object 1 has multiple blocks (e.g., lines) of memory and thus multiple copies of the same metadata stored for each block. In certain examples, a block is a granule of memory, e.g., the smallest block of memory that can be described. In certain examples, a granule is a coherency granule that is the size of data (e.g., packets) that is transferred in a cache coherent system when accessing coherent data. In certain examples, a block is a cache line of data, e.g., where the cache line is the smallest individually addressable subset of memory. In certain examples, metadata (e.g., security metadata) is a multiple (e.g., four) bit value associated with (e.g., stored with) each single block of memory, e.g., each single block of 8 bytes (e.g., 64 bits) of data storage or each single block of 16 bytes (e.g., 128 bits) of data storage.

However, redundantly reproducing the same (e.g., security) metadata multiple times in memory for a single object wastes memory and limits the amount of (e.g., security) metadata that can feasibly be associated with each object in memory (e.g., if each block of memory is 16 bytes, a 16-byte width of metadata in each block would not leave storage space for any block to include data or instructions of the object to be stored therein if the metadata is included in the storage space for the data, or it would double the storage required if stored outside of the storage space for the data).

Examples herein are directed to circuitry, methods, and a storage format for implementing non-redundant metadata storage, e.g., in memory that is addressed by a pointer including a bounds field (e.g., a capability including a bounds field). Examples herein are directed to circuitry, methods, and a storage format for implementing non-redundant metadata storage in memory that is addressed by a pointer including a bounds field and a metadata field (e.g., a capability including a bounds field and a metadata field), and thus do not waste memory or limit the amount of metadata that can be associated with each object in memory. Examples herein are directed to circuitry, methods, and a storage format for implementing non-redundant security metadata storage in memory that is addressed by a pointer including a bounds field and a security field (e.g., a capability including a bounds field and a security field (e.g., validity tag)), and thus provide enhanced security (e.g., via security metadata) and do not waste memory or limit the amount of metadata that can be associated with each object in memory.

Examples herein are directed to circuitry, methods, and a storage format for storing metadata at the beginning of a region (e.g., object) bounded by bounds indicated in a bounds field of a pointer (e.g., bounds field of a capability). Certain examples herein allow for the metadata in memory to be looked up from a pointer (e.g., capability) with a bounds field (e.g., in a single step), for example, since the bounds allow the beginning and/or end of the object (and thus the metadata of a known size stored at the beginning or end, respectively) to be located regardless of where the pointer (e.g., capability) points within the object (e.g., where the pointer is to a block that is not at the beginning or end of the object).

In certain examples, the bounds field indicates the lower bounds and/or upper bounds of the portion of the address space to which a pointer (e.g., capability) authorizes access.

In certain examples, the metadata is stored at the beginning of each object and thus the lower bound is used to determine the location of the metadata in memory. In certain examples, the metadata is stored at the end of each object and thus the upper bound is used to determine the location of the metadata in memory.

Turning now to the Figures, FIG. 1 illustrates a block diagram of a hardware processor 100 (e.g., core) including a metadata (e.g., capability) management circuit 108 and coupled to a memory 120 according to examples of the disclosure. Although the metadata (e.g., capability) management circuit 108 is depicted within the execution circuit 106, it should be understood that the metadata (e.g., capability) management circuit can be located elsewhere, for example, in another component of hardware processor 100 (e.g., within fetch circuit 102) or separate from the depicted components of hardware processor 100.

In certain examples, metadata (e.g., capability) management circuit 108 enforces one or more (e.g., many) requirements for accessing (e.g., storing) security metadata or other metadata alongside each allocation (e.g., object) in memory. For example, metadata may include one or more (e.g., any single or combination of): (i) a tag (or version) number (e.g., used to prevent dangling pointers from accessing memory in a use-after free (UAF) attack), (ii) a bitmap that indicates which portions of an object contain pointers that are to be protected from corruption, (iii) a per-object key or key ID that is assigned to uniquely encrypt and/or decrypt each object, (iv) a type identification (ID) that is associated with each object of that specified type, (v) an ownership ID used to enforce (e.g., according to a Rust specification) ownership transfer and borrowing, (vi) a table specifying the category of each pointer and data item associated with each portion of an object that may contain a distinct pointer or data item, (vii) an identifier for code authorized to access the data such as a code hash value, or (viii) an aggregate cryptographic message authentication code (MAC) value, Integrity-Check Value (ICV), or error correction code (ECC) for the data allocation.

Certain examples utilize a memory corruption detection (MCD) value in each pointer and a corresponding (e.g., matching) MCD value saved in the memory for the memory being pointed to, for example, saved as (e.g., tag) metadata (e.g., data that describes other data) for each block of data being pointed to by the pointer. A MCD value may be a sequence of bits, for example, 2, 3, 4, 5, 6, 7, 8. 9, 10, 11, 12, 13, 14, 15, 16 bits, etc. In certain examples, metadata (e.g., capability) management circuit 108 validates pointers produced by instructions of the applications being executed by the processing system or processor that request access to the memory. Certain examples herein (e.g., of settings of metadata (e.g., capability) management circuit 108) utilize one of more of the following attributes for memory corruption detection: MCD enabled (e.g., to turn the MCD feature on or off), MCD position (e.g., to define the bit position(s) of MCD values (metadata) in pointers), MCD protected space, for example, a prefix in the most significant bit positions of the pointer (e.g., to define the linear address range that is to be protected by the architecture), and MCD directory base (e.g., to point to the memory MCD value (e.g., metadata) table (e.g., directory)).

Certain examples use an ownership ID to enforce (e.g., according to a Rust specification) ownership transfer and borrowing, e.g., with the ownership ID being metadata for a pointer. In certain examples, memory 120 is managed through a system of ownership with a set of rules that the compiler checks at compile time, e.g., according to a Rust specification. In certain examples, the rules of ownership include one or more (e.g., all) of: (i) each value has a variable that is called its "owner", (ii) there can only be one owner at a time for a value, and (iii) when the owner goes out of scope, the value is dropped (e.g., freed from memory).

Depicted hardware processor 100 includes a hardware fetch circuit 102 to fetch an instruction (e.g., from memory 120), e.g., an instruction that is to request access to a block (or blocks) of memory 120 through a pointer with bounds 110 (e.g., a capability) to the block (or blocks) of the memory 120. Depicted hardware processor 100 includes a hardware decoder circuit 104 to decode an instruction, e.g., an instruction that is to request access to a block (or blocks) of memory 120 through a pointer with bounds 110 (e.g., a capability) to the block (or blocks) of the memory 120. Depicted hardware execution circuit 106 is to execute the decoded instruction, e.g., an instruction that is to request access to a block (or blocks) of memory 120 through a pointer with bounds 110 (e.g., a capability) to the block (or blocks) of the memory 120.

In certain examples, metadata (e.g., capability) management circuit 108 is to, in response to receiving an instruction that is requested for fetch, decode, and/or execution, check if the instruction is a bounds instruction (e.g., an instruction that is to access memory via a pointer including a bounds field) or a non-bounds instruction (e.g., a bounds-unaware instruction), for example, and (i) if a bounds instruction, is to allow access to memory 120 storing data and/or instructions (e.g., an object) within the indicated bounds (e.g., but not outside of the bounds), and/or (ii) if a non-bounds instruction, is not to allow access to memory 120 storing data and/or instructions (e.g., an object) within any bounded storage (e.g., object storage). In some examples, this latter property is enforced by applying a default bounds check to the accesses by the non-bounds instruction. In some examples, bounded storage is partially or fully accessible by non-bounds instructions. In certain examples, a bounds instruction is a bounds checking instruction, for example, and is not a BOUND instruction that checks an array index against bounds (e.g., that determines if the first operand (array index) is within the bounds of an array specified by the second operand (bounds operand)).

In certain examples, metadata (e.g., capability) management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction (for example, an instruction authorized to manipulate capabilities, e.g., change the contents of the capabilities themselves), is to allow access to memory 120 storing (1) a capability and/or (2) data and/or instructions (e.g., an object) protected by a capability, and/or (ii) if a non-capability instruction, is not to allow access to memory 120 storing (1) a capability and/or (2) data and/or instructions (e.g., an object) protected by a capability.

In certain examples, metadata (e.g., capability) management circuit 108 is to check if an instruction is a bounds instruction or a non-bounds instruction by checking (i) a field (e.g., opcode) of the instruction (e.g., checking a corresponding bit or bits of the field that indicate if that instruction is a bounds instruction or a non-bounds instruction) and/or (ii) if a particular operand register is a "bounds" type of register (e.g., instead of a general-purpose data register) (e.g., implying that certain register(s) are not to be used to store a bounds field).

In certain examples, metadata (e.g., capability) management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular operand register is a "capability" type of register (e.g., instead of a general-purpose data register) (e.g., implying that certain register(s) are not to be used to store a capability or capabilities). In certain examples, metadata (e.g., capability) management circuit 108 is to manage the capabilities, e.g., only the metadata (e.g., capability) management circuit is to set and/or clear validity tags. In certain examples, metadata (e.g., capability) management circuit 108 is to clear the validity tag of a capability in a register in response to that register being written to by a non-capability instruction. In certain examples, capabilities are encrypted so that they are protected from corruption and forgery without requiring a validity tag. In certain examples, capabilities are split across multiple registers.

In certain examples, the source storage location (e.g., virtual address) in memory 120 for data (e.g., an object) within the bounds of the "pointer with bounds" 110 is an operand of an (e.g., supervisor level or user level) instruction (e.g., having a mnemonic of LoadData) that is to load the data (e.g., an object) included within those bounds from the memory 120 into register(s) 112. In certain examples, the source storage location (e.g., virtual address) in memory 120 for instructions within the bounds of the "pointer with bounds" 110 is accessed by the fetch circuit 102 of the hardware processor 100 to fetch the instructions within the code region demarcated by those bounds from the memory 120. In certain examples, the destination storage location (e.g., virtual address) in memory 120 for data and/or instructions (e.g., an object) to-be-protected by the bounds of the "pointer with bounds" 110 is an operand of an (e.g., supervisor level or user level) instruction (e.g., having a mnemonic of StoreData) that is to store the data and/or instructions (e.g., an object) protected by those bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the bounds field, e.g., to set the lower bound and/or upper bound of an object.

In certain examples, the source storage location (e.g., virtual address) in memory 120 for data and/or instructions (e.g., an object) protected by the metadata and/or bounds of the "pointer with metadata and/or bounds" 110 (e.g., capability) is an operand of an (e.g., supervisor level or user level) instruction (e.g., having a mnemonic of LoadData) that is to load the data and/or instructions (e.g., an object) protected by the metadata and/or bounds from the memory 120 into register(s) 112. In certain examples, the destination storage location (e.g., virtual address) in memory 120 for data and/or instructions (e.g., an object) to-be-protected by the metadata and/or bounds of the "pointer with metadata and/or bounds" 110 is an operand of an (e.g., supervisor level or user level) instruction (e.g., having a mnemonic of StoreData) that is to store the data and/or instructions (e.g., an object) protected by the metadata and/or bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the metadata and/or bounds field(s) (e.g., the fields in FIGS. 2A-4), e.g., to set the metadata and/or bound(s) of an object. In certain example, an instruction set architecture (ISA) includes one or more instructions for manipulating the capability field(s) (e.g., the fields in FIGS. 2A-4), e.g., to set the metadata and/or bound(s) of an object in memory.

In certain examples, metadata (e.g., capability) management circuit 108 is to enforce security properties on changes to metadata (e.g., capability data), for example, for the execution of a single capability instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability unsealing and invocation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, metadata (e.g., capability) management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a metadata (e.g., capability) management circuit 108 provide the foundation on which a capability-based OS, compiler, and runtime can implement a certain programming language (e.g., C and/or C++) language memory safety and compartmentalization.

In certain examples, the capability points to an object that is stored in multiple lines of data. For example, a block of memory may be lines 1 and 2 of data of the (e.g., physical) addressable memory 122 of memory 120 having an address 124 to one (e.g., the first) line (e.g., line 1). Certain examples have a memory of a total size X, where X is any positive integer.

In certain examples, the capability is stored in a single line of data (or less than a single line of data). In certain examples, the capability is stored in multiple lines of data. In certain examples, capabilities (e.g., one or more fields thereof) themselves are also stored in memory 120, for example, in a data structure (e.g., table) for capabilities. In certain examples, a (e.g., validity) tag is stored in data structure for a capability stored in memory. In certain examples, tags (e.g., in data structure) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated for use with metadata (e.g., capabilities)) metadata (e.g., capabilities) register(s) 116 (e.g., registers CAX 116A, CBX 116B, CCX 116C, CDX 116D, etc.).

Hardware processor 100 includes a coupling (e.g., connection) to memory 120. In certain examples, memory 120 is a memory local to the hardware processor (e.g., system memory). In certain examples, memory 120 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 118, for example, to control access (e.g., by the execution unit 106) to the (e.g., addressable memory 122 of) memory 120.

In certain examples, an indication (e.g., name) of the destination register for data and/or instructions (e.g., an object) protected by the metadata and/or bounds of the "pointer with metadata and/or bounds" 110 in register(s) 112 is an operand of an (e.g., supervisor level or user level) instruction (e.g., having a mnemonic of LoadData) that is to load the data and/or instructions (e.g., an object) to-be-protected by the metadata and/or bounds of the "pointer with metadata and/or bounds" 110 from the memory 120 into register(s) 112. In certain examples, an indication (e.g., name) of the source register for data and/or instructions (e.g., an object) to-be-protected by the metadata and/or bounds of the "pointer with metadata and/or bounds" 110 in register(s) 112 is an operand of an (e.g., supervisor level or user level) instruction (e.g., having a mnemonic of Store-Data) that is to store the data and/or instructions (e.g., an object) from the register(s) 112 into memory 120.

In certain examples, metadata (e.g., capability) management circuit 108 uses bounds-based access control for enforcing memory safety, e.g., and low-overhead compartmentalization. Examples herein are directed to metadata (e.g., capability) management circuit 108 for implementing non-redundant metadata storage in memory 120 addressed by a pointer 110 including a bounds field (e.g., a capability including a bounds field). Examples herein are directed to metadata (e.g., capability) management circuit 108 for implementing non-redundant metadata storage in memory 120 that is addressed by a pointer 110 including a bounds field and a metadata field (e.g., a capability including a bounds field and a metadata field), and thus do not waste memory or (e.g., unduly) limit the amount of metadata that can be associated with each object in memory. Examples herein are directed to metadata (e.g., capability) management circuit 108 for implementing non-redundant security metadata storage in memory 120 that is addressed by a pointer 110 including a bounds field and a security field (e.g., a capability including a bounds field and a security field (e.g., validity tag)), and thus provide enhanced security (e.g., via security metadata) and do not waste memory or limit the amount of metadata that can be associated with each object in memory.

The circuitry, methods, and a storage format for implementing non-redundant metadata storage in memory disclosed herein are improvements to the functioning of a processor (e.g., of a computer) itself, e.g., they are improvements to the functioning of a processor (e.g., of a computer) itself as they provide enhanced security (e.g., via security metadata) and do not waste memory or limit the amount of metadata that can be associated with each object in memory. Examples herein are improvements to the functioning of a processor (e.g., of a computer) itself as they allow more efficient utilization of memory.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by metadata (e.g., capability) management circuit 108). In certain examples, each element of the capability contributes to the protection model and is enforced by hardware (e.g., metadata (e.g., capability) management circuit 108).

In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

FIG. 2A illustrates an example format of a pointer with bounds (e.g., a capability) including a validity tag 110A field, a bounds 110B field, and an address 110C (e.g., virtual address) field according to examples of the disclosure.

In certain examples, the format of a pointer with bounds (e.g., a capability) includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

FIG. 2B illustrates an example format of a pointer with bounds (e.g., a capability) including a validity tag 110A field, a permission(s) 110D field, an object type 110E field, a version field 110F, a bounds 110B field, and an address 110C field according to examples of the disclosure.

In certain examples, the format of a pointer with bounds (e.g., a capability) includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization. In some examples, instructions accepting the capability as an operand specify allowable types that a particular sequence of code can operate upon, e.g., and the processor may generate an exception if the type encoded into metadata stored alongside the object does not match any of the specified allowable types. A version field 110F to store a version identifier (e.g., MCD value discussed herein).

In certain examples, permissions 110D include one or more of the following: "Load" to allow a load from memory protected by the capability, "Store" to allow a store to memory protected by the capability, "Execute" to allow execution of instructions protected by the capability, "Load-Cap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

Figure 3A:
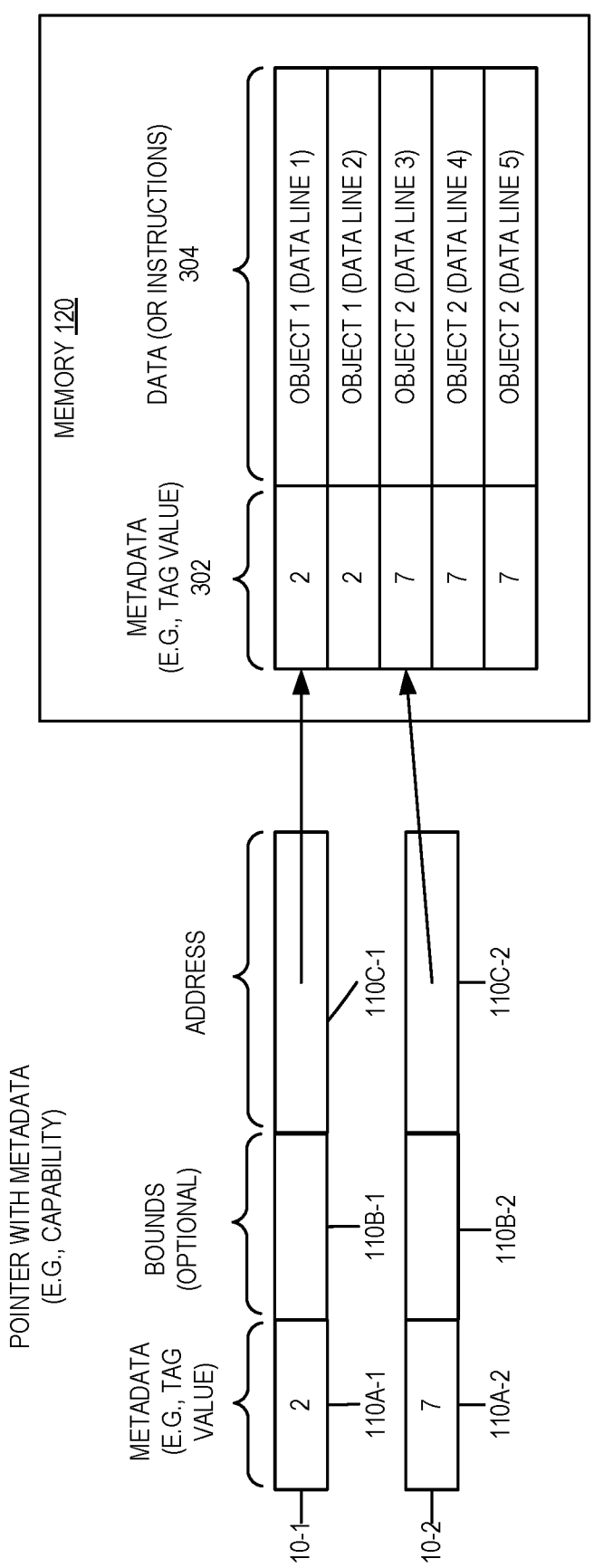
FIG. 3A illustrates a pointer (e.g., capability) format with a metadata field, an (optional) bounds field, and an address field pointing to a corresponding object stored in memory with redundant metadata storage according to examples of the disclosure.

FIG. 3A illustrates a pointer (e.g., capability) format 110 with a metadata field, an (optional) bounds field, and an address field pointing to a corresponding object stored in memory 120 with redundant metadata 302 storage according to examples of the disclosure. FIG. 3A depicts a first pointer 110-1 that includes a metadata field 110A-1, an (optional) bounds field 110B-1, and an address field 110C-1 pointing to a corresponding first object ("object 1") stored in a proper subset of lines one and two in memory 120 with redundant metadata 302 for (e.g., in) both lines (shown as a value of "2", e.g., as a MCD value example). FIG. 3A depicts a second pointer 110-2 that includes a metadata field 110A-2, an (optional) bounds field 110B-2, and an address field 110C-2 pointing to a corresponding second object ("object 2") stored in a proper subset of lines three, four, and five in memory 120 with redundant metadata 302 for (e.g., in) all three lines (shown as a value of "7", e.g., as a MCD value example).

In certain examples, it is desirable to not have redundant metadata, for example, to use non-redundant metadata storage to provide enhanced security (e.g., via security metadata) and do not waste memory or limit the amount of metadata that can be associated with each object in memory. In FIG. 3A, it is shown that the additional instances of the same metadata values are utilizing storage space that could otherwise be used for data (or instructions) 304 for each object. In certain examples, both the metadata 302 (e.g., at least some metadata but not the validity tag) and data (or instructions) 304 are stored within addressable memory (e.g., within cache lines of the memory) (e.g., within the ordinary data storage portion of the cache line and not in separate "only metadata" storage) in contrast to (i) storing the metadata in a separate "only metadata" data structure (e.g., table) that is or is not part of the addressable memory or (ii) storing the metadata in special metadata storage added to each of the cache lines (e.g., and thus a metadata and its data cumulatively being wider than line width 310 in FIG. 3B).

Figure 3B:
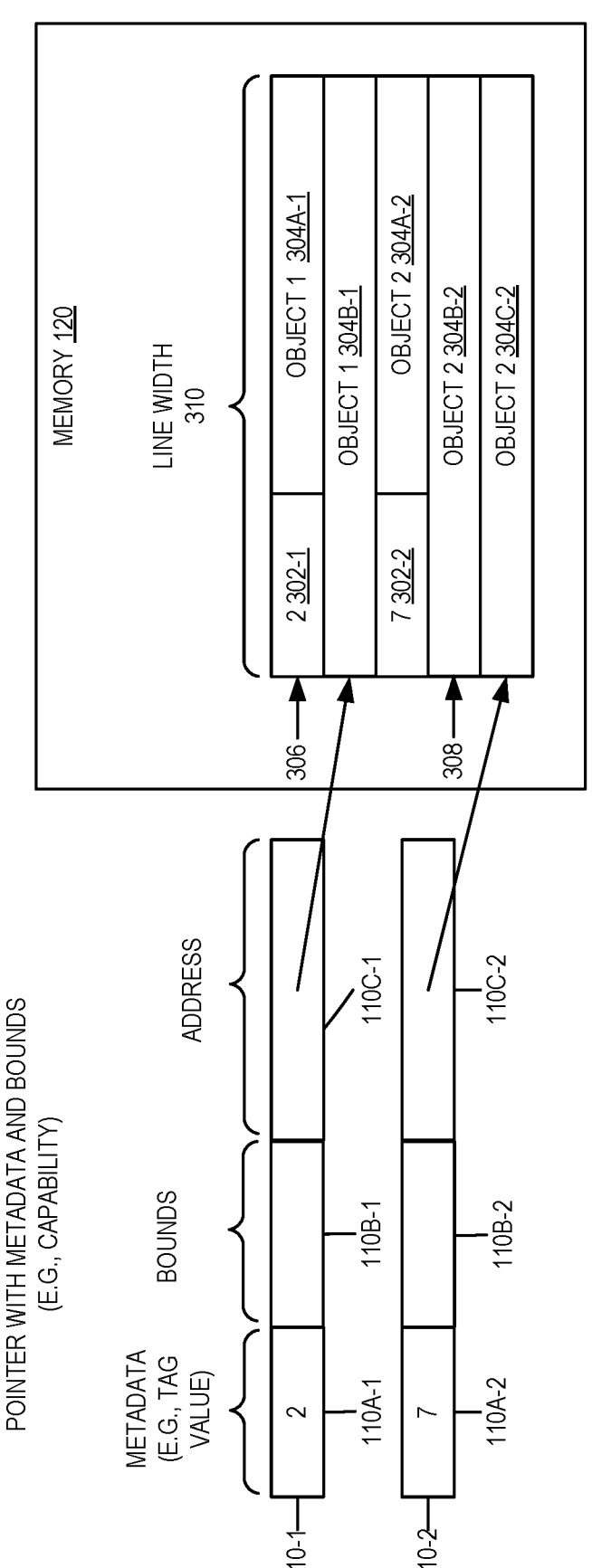
FIG. 3B illustrates a pointer (e.g., capability) format with a metadata field, a bounds field, and an address field pointing to a corresponding object stored in memory with non-redundant metadata storage according to examples of the disclosure.

FIG. 3B illustrates a pointer (e.g., capability) format 110 with a metadata field, a bounds field, and an address field pointing to a corresponding object stored in memory 120 with non-redundant metadata 302 storage according to examples of the disclosure. FIG. 3B includes an example of five lines (e.g., although it may be any plurality) of addressable memory 120 that each have a same line (e.g., cache line) width 310, for example, allowing for non-redundant metadata to be stored in the ordinary data portion of the lines (e.g., cache lines), e.g., in a portion that otherwise is usable for ordinary data storage. FIG. 3B depicts a first pointer 110-1 that includes a metadata field 110A-1, a bounds field 110B-1, and an address field 110C-1 pointing to a corresponding first object ("object 1") 304A stored in proper subset 304A-1 of line one and all of line two 304B-1 in memory 120 with a single instance of non-redundant metadata 302-1 for both lines (shown as a value of "2", e.g., as a MCD value example). FIG. 3B depicts a second pointer 110-2 that includes a metadata field 110A-2, a bounds field 110B-2, and an address field 110C-2 pointing to a corresponding second object ("object 2") 304B stored in proper subset 304A-2 of line three, all of line four 304B-2, and all of line five 304C-2 in memory 120 with a single instance of non-redundant metadata 302-2 for all three lines (shown as a value of "7", e.g., as a MCD value example).

In certain examples, the bounds field indicates the lower bound and/or upper bound of an object, for example, bounds field 110B-1 for object 1 indicating (e.g., via address(es) for that line) that line 1 is the lower bound of object 1 and line 2 is the upper bound of object 1, and bounds field 110B-2 for object 2 indicating (e.g., via address(es) for that line) that line 3 is the lower bound of object 2 and line 5 is the upper bound of object 2. For example, that address 306 is the lower bound of object 1 (e.g., and address field 110C-1 points to line 2 304B-1 of object 1 to access that particular line) and address 308 is the lower bound of object 2 (e.g., and address field 110C-2 points to line 5 304C-2 of object 2 to access that particular line). Although bounds are described in this example as being lines, it should be understood that bounds may be identified at other granularities, for example, in terms of one or more bytes of memory.

In FIG. 3B, it is shown that the additional instances of the same metadata values are not present, and thus not utilizing storage space that could otherwise be used for data (or instructions) 304 for each object, e.g., the extra space instead used for data (or instructions) in data line 2 304B-1 for the first object and the extra space for data (or instructions) in data line 4 304B-2 and data line 5 304C-2 for the second object.

It should be understood that a metadata (e.g., capability) management circuit 108 is to have knowledge of the format used, e.g., such that it does not incorrectly assume that a data (or instruction) value stored according to the format in FIG. 3B in the formerly metadata portion of a line according to the format in FIG. 3A is metadata, e.g., for security reasons.

In certain examples, the metadata is stored within addressable memory, e.g., addressable memory 122 in the Figures).

Figure 4:
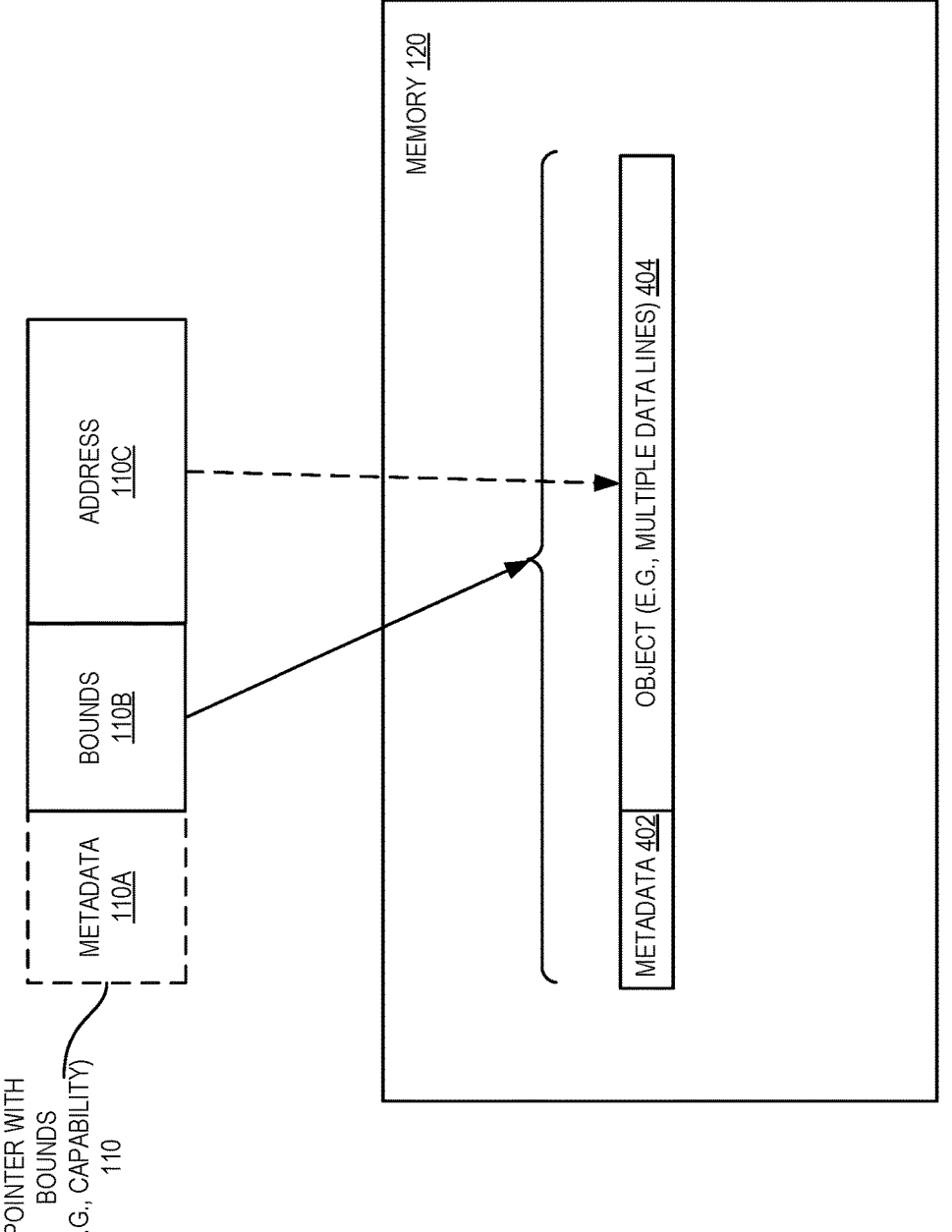
FIG. 4 illustrates a pointer (e.g., capability) format with a metadata field, a bounds field, and an address field pointing to a corresponding object stored in memory with non-redundant metadata storage according to examples of the disclosure.

FIG. 4 illustrates a pointer (e.g., capability) 110 format with an (optional) metadata field 110A, bounds field 110B, and an address field 110C pointing to a corresponding object stored in memory 120 (e.g., addressable memory 122) with non-redundant metadata storage according to examples of the disclosure.

The format of the pointer 110 with bounds field 110B in FIG. 4 illustrates that a single metadata field 402 in memory 120 can be utilized for a corresponding single (e.g., data) object 404 in memory 120, e.g., in a single, contiguous section (e.g., allocation) of memory for both the metadata 402 and the object itself (e.g., data and/or instructions) 404.

In certain examples, instead of using unbounded pointers to reference flat memory, metadata (e.g., capability) management circuit uses a pointer 110 with object bounds 110B (e.g., capability that contains an object bounds) to reference memory. This provides the information needed to locate a single copy of metadata at the beginning of each object (e.g., in a single step) from any pointer to the object. FIG. 4 illustrates that the bounds are stored separately from the address 110C (e.g., offset), but within the same overall pointer with bounds (e.g., capability) set.

In certain examples, whenever an access is attempted through a pointer with bounds (e.g., a capability), the processor is to first lookup metadata at the beginning of the object in memory as determined by the bounds, check that metadata, and only perform the requested access if the check(s) of the metadata indicate that the access is authorized.

In certain examples, a processor is switchable between different formats for the storage of metadata in memory, e.g., switchable between the formats shown in FIG. 3A and FIG. 3B and/or switchable between the formats shown in FIG. 3A, FIG. 3B, and FIG. 4.

FIG. 5 illustrates operations 500 of a method of processing a memory access request for a pointer (e.g., capability) having a metadata field for access control of an object in memory with non-redundant metadata storage according to examples of the disclosure. Some or all of the operations 500 (or other processes described herein, or variations, and/or combinations thereof) are performed under the control of a metadata (e.g., capability) management circuit and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 500 are performed by metadata (e.g., capability) management circuit 108 of the other figures.

The operations 500 include, at block 502, handling (e.g., receiving) a memory access request that comprises a pointer with a bounds value. The operations 500 further include, at block 504, computing the beginning of the object from the bounds stored in the pointer (e.g., in the capability) and loading metadata from the computed location in memory into the processor (e.g., register(s) thereof). The operations 500 further include, at block 506, determining if the security checks based on the metadata indicate that the memory access is authorized. And if yes, the operations 500 further include, at block 508, proceeding with the memory access to the object in memory. And if no, the operations 500 further include, at block 510, generating an exception, e.g., not proceeding with the memory access to the object in memory.

In certain examples, metadata updates are performed (e.g., in a single step) through a pointer with bounds (e.g., a capability), such that the processor is to first lookup metadata at the beginning of the object in memory as determined by the bounds, and update that metadata in the memory.

For example, an instruction to update a stored version value of a capability as an attribute of an object in memory may be defined as follows:

SetCapVersion cap: c128, ver: r64 where SetCapVersion is the mnemonic for an opcode that indicates the operations for the instruction are to lookup the metadata storage region for the (e.g., at the beginning of the) specified object based on the bounds stored in the capability, and store the specified "version" value (e.g., version 110F discussed in reference to FIG. 2B) into the metadata storage region (e.g., at the beginning) of the object, first input operand cap: c128 is the capability (e.g., c128 being a 128-bit register(s) storing the capability), and second input operand ver: r64 is the version value (e.g., r64 being a 64-bit register storing the version value).

Objects may be associated with multiple metadata items of the same or varying types. For example, an ISA may include one or more respective instructions to update other fields, e.g., to update one or more of the fields discussed in reference to FIGS. 2A-4. For example, an instruction to lookup the metadata storage region of the specified object based on the bounds stored in the capability, and store the specified "permission" value (e.g., permissions 110D discussed in reference to FIG. 2B) into the metadata storage region (e.g., at the beginning) of the object; an instruction to lookup the metadata storage region of the specified object based on the bounds stored in the capability, and store the specified "object type" value (e.g., object type 110E discussed in reference to FIG. 2B) into the metadata storage region (e.g., at the beginning) of the object, and/or an instruction to lookup the metadata storage region of the specified object based on the bounds stored in the capability, and store the specified "tag" value (e.g., tag value stored in 110A-1 or 110A-2 discussed in reference to FIG. 3B) into the metadata storage region (e.g., at the beginning) of the object.

Figure 6:
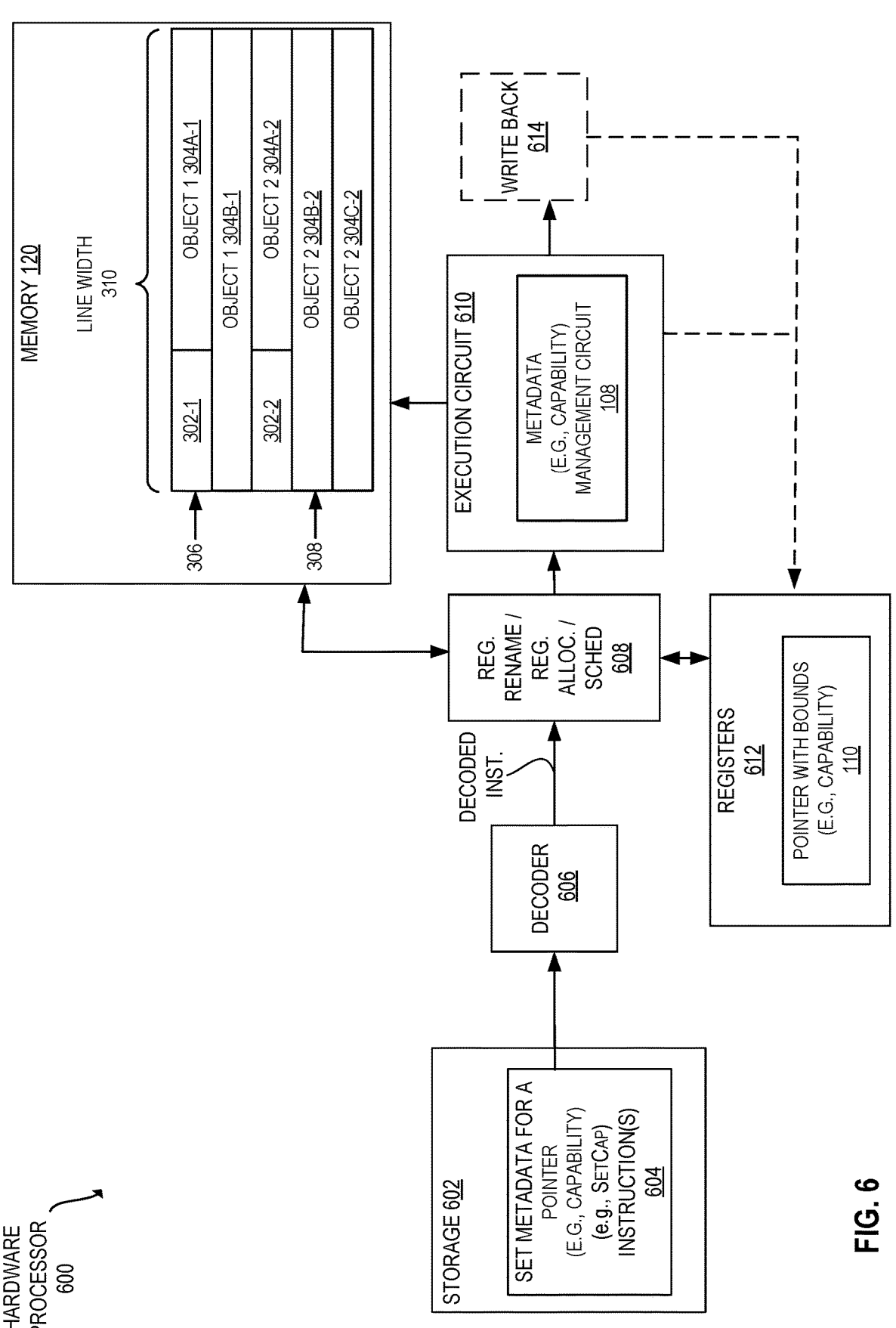
FIG. 6 illustrates a hardware processor coupled to storage that includes one or more set metadata for a pointer (e.g., capability) instructions according to examples of the disclosure.

FIG. 6 illustrates a hardware processor 600 coupled to storage 602 that includes one or more set metadata for a pointer (e.g., capability) instructions 604 according to examples of the disclosure. In certain examples, such an (e.g., SetCap) instruction is according to any of the disclosure herein. In certain examples, such an (e.g., SetCap) instruction includes a field indicating it is allowed (e.g., has the capability) to access a certain object (e.g., its metadata) stored in the destination in memory 120.

In certain examples, e.g., in response to a request to perform a set metadata in memory operation, the instruction (e.g., macro-instruction) 604 is fetched from storage 602 and sent to decoder 606. In the depicted example, the decoder 606 (e.g., decoder circuit) decodes the instruction into a decoded instruction (e.g., one or more micro-instructions or micro-operations). The decoded instruction is then sent for execution, e.g., via scheduler circuit 608 to schedule the decoded instruction for execution.

In certain examples, (e.g., where the processor/core supports out-of-order (OoO) execution), the processor includes a register rename/allocator circuit 608 coupled to register file 612 (e.g., and memory 120) to allocate resources and perform register renaming on registers (e.g., registers associated with the initial sources and final destination of the instruction). In certain examples, (e.g., for out-of-order execution), the processor includes one or more scheduler circuits 608 coupled to the decoder 606. The scheduler circuit(s) may schedule one or more operations associated with decoded instructions, including one or more operations decoded from instruction 604, e.g., for execution on the execution circuit 610. In the depicted example, metadata (e.g., capability) management circuit 108 is within the execution circuit 610.

As one example, a decoded instruction 604 is to take (e.g., updated) metadata from an input operand (e.g., in register(s) 612) and an input of pointer with bounds 110 (e.g., that input being a source register(s) 612 storing that pointer 110 with bounds, determining the location of the corresponding metadata field in the memory 120 based on the bounds field of the capability in the source register, and storing the update for the metadata at the location of the corresponding metadata field (e.g., without modifying the object being pointed to). In one example, pointer with bounds 110 points to object "2"

in memory 120, and the execution circuit 610 (e.g., metadata (e.g., capability) management circuit 108) determines the location 308 of the corresponding metadata field 302-2 in the memory 120 based on the bounds field of the pointer with bounds (e.g., capability) in the source register, and stores the update for the metadata at the location of the corresponding metadata field (e.g., without modifying the object 304-2 being pointed to). In another example, an instruction performs these checks, e.g., and additionally or alternatively to updating the metadata field in memory, updates the data (or instructions) stored in the memory for that object.

In certain examples, the execution includes checking by the metadata (e.g., capability) management circuit 108 that the requested access to the metadata in memory 120 is permitted.

In certain examples, a write back circuit 614 is included to write back results of an instruction to a destination (e.g., write them to memory 120), for example, so those results are visible within the memory 120 (e.g., visible outside of the execution circuit that produced those results).

One or more of these components (e.g., decoder 606, register rename/register allocator/scheduler 608, execution circuit 610, registers (e.g., register file) 612, memory 120, or write back circuit 614) may be in a single core of a hardware processor (e.g., and multiple cores each with an instance of these components).

FIG. 7 is a flow diagram illustrating operations 700 of a method of processing a set metadata instruction according to examples of the disclosure. In certain examples, a processor (e.g., or processor core) performs operations 700 of the method, e.g., in response to receiving a request to execute an instruction from software. Depicted operations 700 of the method includes processing a single instruction by: fetch the single instruction comprising fields to indicate a first source (e.g., register) storing a pointer (e.g., capability) having a bounds field for an object in memory, a second source (e.g., register) storing an update for metadata of the object, and an opcode to indicate that an execution circuit is to determine a location of the metadata in the memory based on the bounds field of the pointer, and store the update for the metadata at the location at 702, decode the instruction into a decoded instruction at 704, retrieve data associated with the fields at 706, (optionally) schedule the decoded instruction for execution at 708, execute the decoded instruction according to the opcode at 710, and commit a result of the executed instruction at 712.

FIG. 8 is a flow diagram illustrating operations 800 of a method of processing a memory access request for a pointer (e.g., capability) having a bounds field and a metadata field for access control of an object in memory with non-redundant metadata storage according to examples of the disclosure. Some or all of the operations 800 (or other processes described herein, or variations, and/or combinations thereof) are performed under the control of a metadata (e.g., capability) management circuit and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by metadata (e.g., capability) management circuit 108 of the other figures.

The operations 800 include, at block 802, generating, by an execution circuit of a processor, a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed. The operations 800 further include, at block 804, determining, by a capability management circuit of the processor, a first location of a corresponding first metadata field in the memory based on the bounds field of the first capability. The operations 800 further include, at block 806, proceeding, by the capability management circuit of the processor, with the first memory access request in response to a match of metadata in the single metadata field of the first capability against metadata at the corresponding first metadata field in the memory. The operations 800 further include, at block 808, determining, by the capability management circuit of the processor, a second location of a corresponding second metadata field in the memory based on the bounds field of the second capability. The operations 800 further include, at block 810, proceeding, by the capability management circuit of the processor, with the second memory access request in response to a match of metadata in the single metadata field of the second capability against metadata at the corresponding second metadata field in the memory.

Exemplary architectures, systems, etc. that the above may be used in are detailed below. Exemplary instruction formats for capability instructions are detailed below.

At least some examples of the disclosed technologies can be described in view of the following examples:

Example 1. An apparatus comprising:

an execution circuit to generate a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed; and a metadata (e.g., capability) management circuit to:

determine a first location of a corresponding first metadata field in the memory based on the bounds field of the first capability, proceed with the first memory access request in response to a match of metadata in the single metadata field of the first capability against metadata at the corresponding first metadata field in the memory, determine a second location of a corresponding second metadata field in the memory based on the bounds field of the second capability, and proceed with the second memory access request in response to a match of metadata in the single metadata field of the second capability against metadata at the corresponding second metadata field in the memory.

Example 2. The apparatus of example 1, wherein the metadata (e.g., capability) management circuit is to generate an exception in response to there not being the match for the first memory access request or the second memory access request.

Example 3. The apparatus of example 1, wherein the first single object in the memory is a plurality of lines of the memory and the second different sized single object in the memory is more lines than the plurality of lines.

Example 4. The apparatus of example 1, wherein:

the single metadata field of the first capability identifies a first tag to be used by the metadata (e.g., capability) management circuit to unlock access to the first single object in the memory, and the single metadata field of the second capability identifies a second tag to be used by the metadata (e.g., capability) management circuit to unlock access to the second different sized single object in the memory.

Example 5. The apparatus of example 1, wherein:

the bounds field of the first capability identifies a first bitmap, that indicates which portion of the first single object contains pointers that are to be protected from corruption, to be used by the metadata (e.g., capability) management circuit to unlock access to the first single object in the memory, and the bounds field of the second capability identifies a second bitmap, that indicates which portion of the second different sized single object contains pointers that are to be protected from corruption, to be used by the metadata (e.g., capability) management circuit to unlock access to the second different sized single object in the memory.

Example 6. The apparatus of example 1, wherein:

the single metadata field of the first capability identifies a first key to be used by the metadata (e.g., capability) management circuit to decrypt and unlock access to the first single object in the memory, and the single metadata field of the second capability identifies a second key to be used by the metadata (e.g., capability) management circuit to decrypt and unlock access to the second different sized single object in the memory.

Example 7. The apparatus of example 1, wherein:

the single metadata field of the first capability identifies a first object type to be used by the metadata (e.g., capability) management circuit to unlock access to the first single object in the memory, and the single metadata field of the second capability identifies a second object type to be used by the metadata (e.g., capability) management circuit to unlock access to the second different sized single object in the memory.

Example 8. The apparatus of example 1, further comprising a decoder circuit to decode a single instruction into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and the execution circuit is to execute the decoded single instruction according to its opcode.

Example 9. A method comprising:

generating, by an execution circuit of a processor, a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed;

determining, by a metadata (e.g., capability) management circuit of the processor, a first location of a corresponding first metadata field in the memory based on the bounds field of the first capability;

proceeding, by the metadata (e.g., capability) management circuit of the processor, with the first memory access request in response to a match of metadata in the single metadata field of the first capability against metadata at the corresponding first metadata field in the memory;

determining, by the metadata (e.g., capability) management circuit of the processor, a second location of a corresponding second metadata field in the memory based on the bounds field of the second capability; and proceeding, by the metadata (e.g., capability) management circuit of the processor, with the second memory access request in response to a match of metadata in the single metadata field of the second capability against metadata at the corresponding second metadata field in the memory.

Example 10. The method of example 9, further comprising generating, by the metadata (e.g., capability) management circuit of the processor, an exception in response to there not being the match for the first memory access request or the second memory access request.

Example 11. The method of example 9, wherein the first single object in the memory is a plurality of lines of the memory and the second different sized single object in the memory is more lines than the plurality of lines.

Example 12. The method of example 9, wherein:

the single metadata field of the first capability identifies a first tag to be used by the metadata (e.g., capability) management circuit to unlock access to the first single object in the memory, and the single metadata field of the second capability identifies a second tag to be used by the metadata (e.g., capability) management circuit to unlock access to the second different sized single object in the memory.

Example 13. The method of example 9, wherein:

the bounds field of the first capability identifies a first bitmap, that indicates which portion of the first single object contains pointers that are to be protected from corruption, to be used by the metadata (e.g., capability) management circuit to unlock access to the first single object in the memory, and the bounds field of the second capability identifies a second bitmap, that indicates which portion of the second different sized single object contains pointers that are to be protected from corruption, to be used by the metadata (e.g., capability) management circuit to unlock access to the second different sized single object in the memory.

Example 14. The method of example 9, wherein:

the single metadata field of the first capability identifies a first key to be used by the metadata (e.g., capability) management circuit to decrypt and unlock access to the first single object in the memory, and the single metadata field of the second capability identifies a second key to be used by the metadata (e.g., capability) management circuit to decrypt and unlock access to the second different sized single object in the memory.

Example 15. The method of example 9, wherein:

the single metadata field of the first capability identifies a first object type to be used by the metadata (e.g., capability) management circuit to unlock access to the first single object in the memory, and the single metadata field of the second capability identifies a second object type to be used by the metadata (e.g., capability) management circuit to unlock access to the second different sized single object in the memory.

Example 16. The method of example 9, further comprising:

decoding a single instruction, by a decoder circuit of the processor, into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and executing, by the execution circuit, the decoded single instruction according to its opcode.

Example 17. A system comprising:

a memory; and a processor coupled to the memory, the processor comprising:

an execution circuit to generate a first memory access request for a first single object in the memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed, and a metadata (e.g., capability) management circuit to:

determine a first location of a corresponding first metadata field in the memory based on the bounds field of the first capability, proceed with the first memory access request in response to a match of metadata in the single metadata field of the first capability against metadata at the corresponding first metadata field in the memory, determine a second location of a corresponding second metadata field in the memory based on the bounds field of the second capability, and proceed with the second memory access request in response to a match of metadata in the single metadata field of the second capability against metadata at the corresponding second metadata field in the memory.

Example 18. The system of example 17, wherein the metadata (e.g., capability) management circuit is to generate an exception in response to there not being the match for the first memory access request or the second memory access request.

Example 19. The system of example 17, wherein the first single object in the memory is a plurality of lines of the memory and the second different sized single object in the memory is more lines than the plurality of lines.

Example 20. The system of example 17, wherein:

the single metadata field of the first capability identifies a first tag to be used by the metadata (e.g., capability) management circuit to unlock access to the first single object in the memory, and the single metadata field of the second capability identifies a second tag to be used by the metadata (e.g., capability) management circuit to unlock access to the second different sized single object in the memory.

Example 21. The system of example 17, wherein:

the bounds field of the first capability identifies a first bitmap, that indicates which portion of the first single object contains pointers that are to be protected from corruption, to be used by the metadata (e.g., capability) management circuit to unlock access to the first single object in the memory, and the bounds field of the second capability identifies a second bitmap, that indicates which portion of the second different sized single object contains pointers that are to be protected from corruption, to be used by the metadata (e.g., capability) management circuit to unlock access to the second different sized single object in the memory.

Example 22. The system of example 17, wherein:

the single metadata field of the first capability identifies a first key to be used by the metadata (e.g., capability) management circuit to decrypt and unlock access to the first single object in the memory, and the single metadata field of the second capability identifies a second key to be used by the metadata (e.g., capability) management circuit to decrypt and unlock access to the second different sized single object in the memory.

Example 23. The system of example 17, wherein:

the single metadata field of the first capability identifies a first object type to be used by the metadata (e.g., capability) management circuit to unlock access to the first single object in the memory, and the single metadata field of the second capability identifies a second object type to be used by the metadata (e.g., capability) management circuit to unlock access to the second different sized single object in the memory.

Example 24. The system of example 17, wherein the processor further comprises a decoder circuit to decode a single instruction into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and the execution circuit is to execute the decoded single instruction according to its opcode.

Example 25. A non-transitory machine readable medium that stores code that when executed by a machine causes the machine to perform a method comprising:

generating, by an execution circuit of a processor, a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed;

determining, by a metadata (e.g., capability) management circuit of the processor, a first location of a corresponding first metadata field in the memory based on the bounds field of the first capability;

proceeding, by the metadata (e.g., capability) management circuit of the processor, with the first memory access request in response to a match of metadata in the single metadata field of the first capability against metadata at the corresponding first metadata field in the memory;

determining, by the metadata (e.g., capability) management circuit of the processor, a second location of a corresponding second metadata field in the memory based on the bounds field of the second capability; and proceeding, by the metadata (e.g., capability) management circuit of the processor, with the second memory access request in response to a match of metadata in the single metadata field of the second capability against metadata at the corresponding second metadata field in the memory.

Example 26. The non-transitory machine readable medium of example 25, wherein the method further comprises generating, by the metadata (e.g., capability) management circuit of the processor, an exception in response to there not being the match for the first memory access request or the second memory access request.

Example 27. The non-transitory machine readable medium of example 25, wherein the first single object in the memory is a plurality of lines of the memory and the second different sized single object in the memory is more lines than the plurality of lines.

Example 28. The non-transitory machine readable medium of example 25, wherein:

the single metadata field of the first capability identifies a first tag to be used by the metadata (e.g., capability) management circuit to unlock access to the first single object in the memory, and the single metadata field of the second capability identifies a second tag to be used by the metadata (e.g., capability) management circuit to unlock access to the second different sized single object in the memory.

Example 29. The non-transitory machine readable medium of example 25, wherein:

the bounds field of the first capability identifies a first bitmap, that indicates which portion of the first single object contains pointers that are to be protected from corruption, to be used by the metadata (e.g., capability) management circuit to unlock access to the first single object in the memory, and the bounds field of the second capability identifies a second bitmap, that indicates which portion of the second different sized single object contains pointers that are to be protected from corruption, to be used by the metadata (e.g., capability) management circuit to unlock access to the second different sized single object in the memory.

Example 30. The non-transitory machine readable medium of example 25, wherein:

the single metadata field of the first capability identifies a first key to be used by the metadata (e.g., capability) management circuit to decrypt and unlock access to the first single object in the memory, and the single metadata field of the second capability identifies a second key to be used by the metadata (e.g., capability) management circuit to decrypt and unlock access to the second different sized single object in the memory.

Example 31. The non-transitory machine readable medium of example 25, wherein:

the single metadata field of the first capability identifies a first object type to be used by the metadata (e.g., capability) management circuit to unlock access to the first single object in the memory, and the single metadata field of the second capability identifies a second object type to be used by the metadata (e.g., capability) management circuit to unlock access to the second different sized single object in the memory.

Example 32. The non-transitory machine readable medium of example 25, wherein the method further comprises:

decoding a single instruction, by a decoder circuit of the processor, into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and executing, by the execution circuit, the decoded single instruction according to its opcode.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 9A:
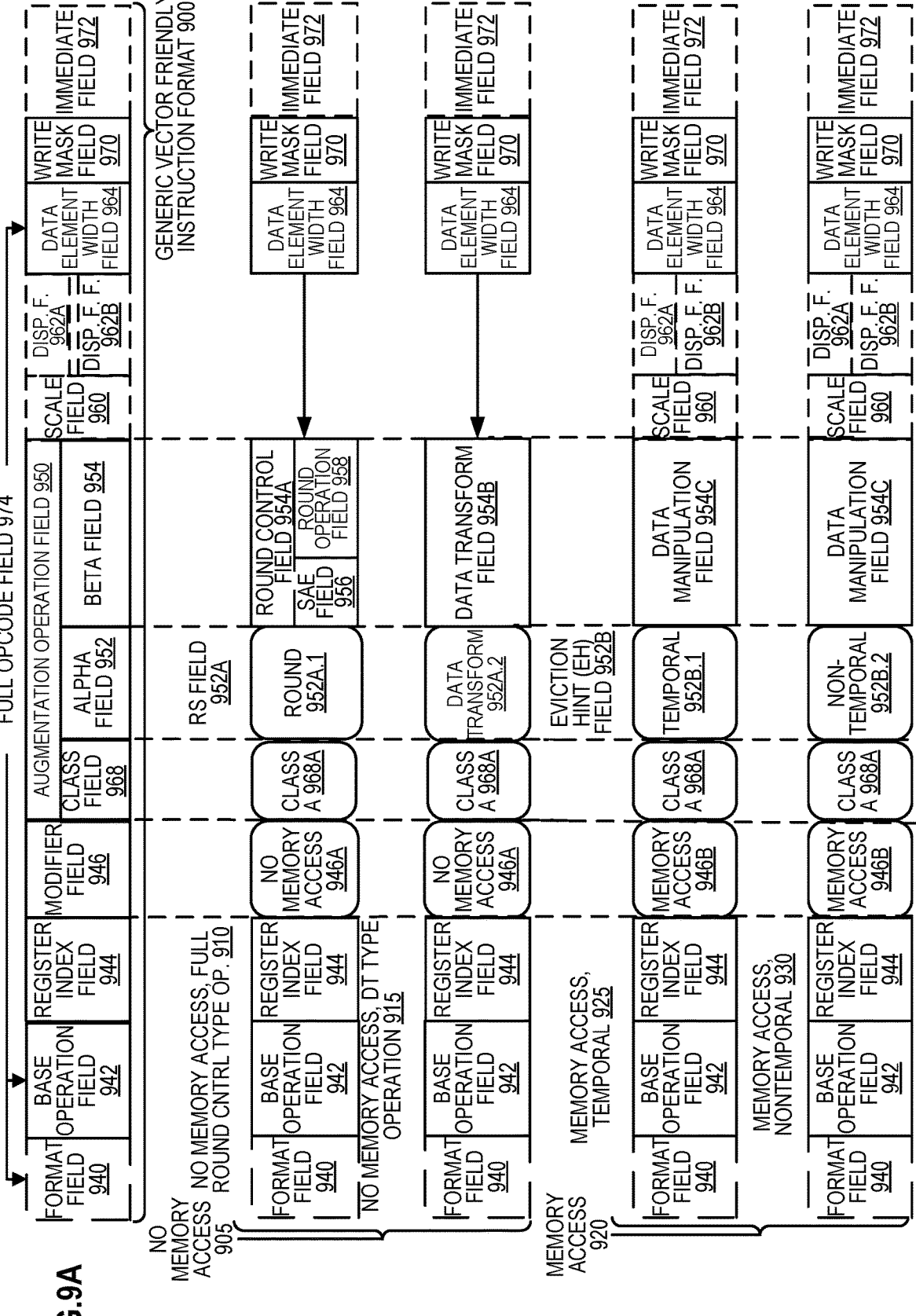
FIG. 9A is a block diagram illustrating a generic vector friendly instruction format and class A instruction templates thereof according to examples of the disclosure.
Figure 9B:
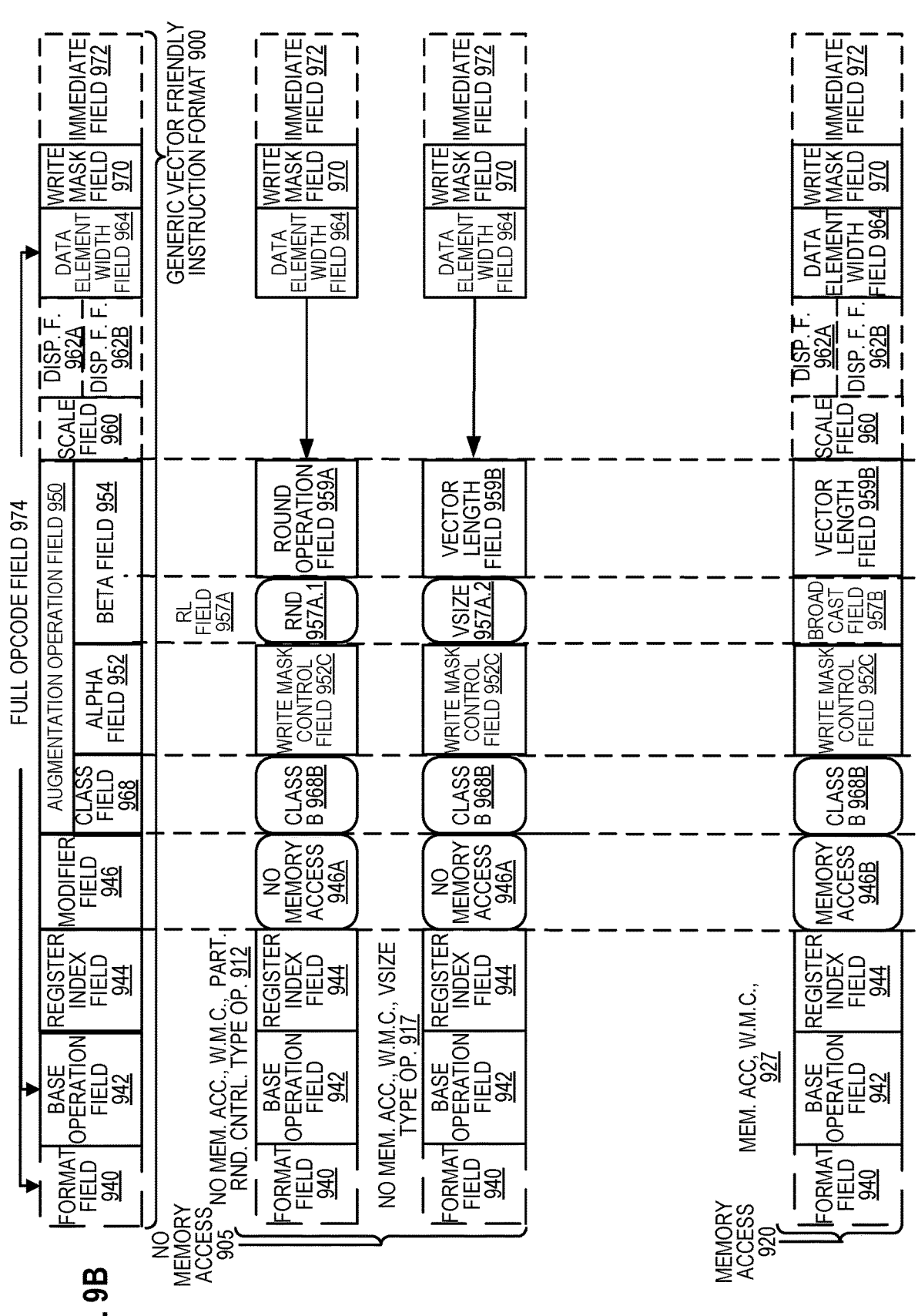
FIG. 9B is a block diagram illustrating the generic vector friendly instruction format and class B instruction templates thereof according to examples of the disclosure.

FIGS. 9A-9B are block diagrams illustrating a generic vector friendly instruction format and instruction templates thereof according to examples of the disclosure. FIG. 9A is a block diagram illustrating a generic vector friendly instruction format and class A instruction templates thereof according to examples of the disclosure; while FIG. 9B is a block diagram illustrating the generic vector friendly instruction format and class B instruction templates thereof according to examples of the disclosure. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 950—its content distinguishes which one of a variety of different operations to be performed in addition to the base operation. This field is context specific. In one example of the disclosure, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*index+base$).

Displacement Field 962A—its content is used as part of memory address generation (e.g., for address generation that uses $2^{scale}*index+base+displacement$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different examples may implement only one or none of the two.

Data element width field 964—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While examples of the disclosure are described in which the write mask field's 970 content selects one of a number of write mask registers that contains the write mask to be used (and thus the write mask field's 970 content indirectly identifies that masking to be performed), alternative examples instead or additional allow the mask write field's 970 content to directly specify the masking to be performed.

Immediate field 972—its content allows for the specification of an immediate. This field is optional in the sense that it is not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement factor field 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described examples of the disclosure the round control field 954A includes a suppress all floating-point exceptions (SAE) field 956 and a round operation control field 958, alternative examples may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating-point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one example of the disclosure where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement factor field 962B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A. 1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement factor field 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating-point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one example of the disclosure where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement factor field 962B.

With regard to the generic vector friendly instruction format 900, a full opcode field 974 is shown including the format field 940, the base operation field 942, and the data element width field 964. While one example is shown where the full opcode field 974 includes all of these fields, the full opcode field 974 includes less than all of these fields in examples that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to examples of the disclosure. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although examples of the disclosure are described with reference to the specific vector friendly instruction format 1000 in the context of the generic vector friendly instruction format 900 for illustrative purposes, the disclosure is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the disclosure is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one example of the disclosure).

The second-fourth bytes (EVEX Bytes 1-3) include a number of bit fields providing specific capability.

REX field 1005 (EVEX Byte 1, bits [7-5])—consists of an EVEX.R bit field (EVEX Byte 1, bit [7]-R), EVEX.X bit field (EVEX byte 1, bit [6]-X), and EVEX.B bit field (EVEX byte 1, bit [5]-B). The EVEX.R, EVEX.X, and EVEX.B bit fields provide the same functionality as the corresponding VEX bit fields, and are encoded using Is complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field and is the EVEX.R' bit field (EVEX Byte 1, bit [4]-R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]-mmmm)—its content encodes an implied leading opcode byte (0F, 0F 38, or 0F 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—If EVEX.U=0, it indicates class A or EVEX.U0; if EVEX.U=1, it indicates class B or EVEX.U1.

Prefix encoding field 1025 (EVEX byte 2, bits [1:0]-pp)-provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2-bit SIMD prefix encodings, and thus not require the expansion.

Alpha field 952 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 954 (EVEX byte 3, bits [6:4]-SSS, also known as EVEX.$S_{2-0}$, EVEX.$r_{2-0}$, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

Figures 10A, 10B, 10C:
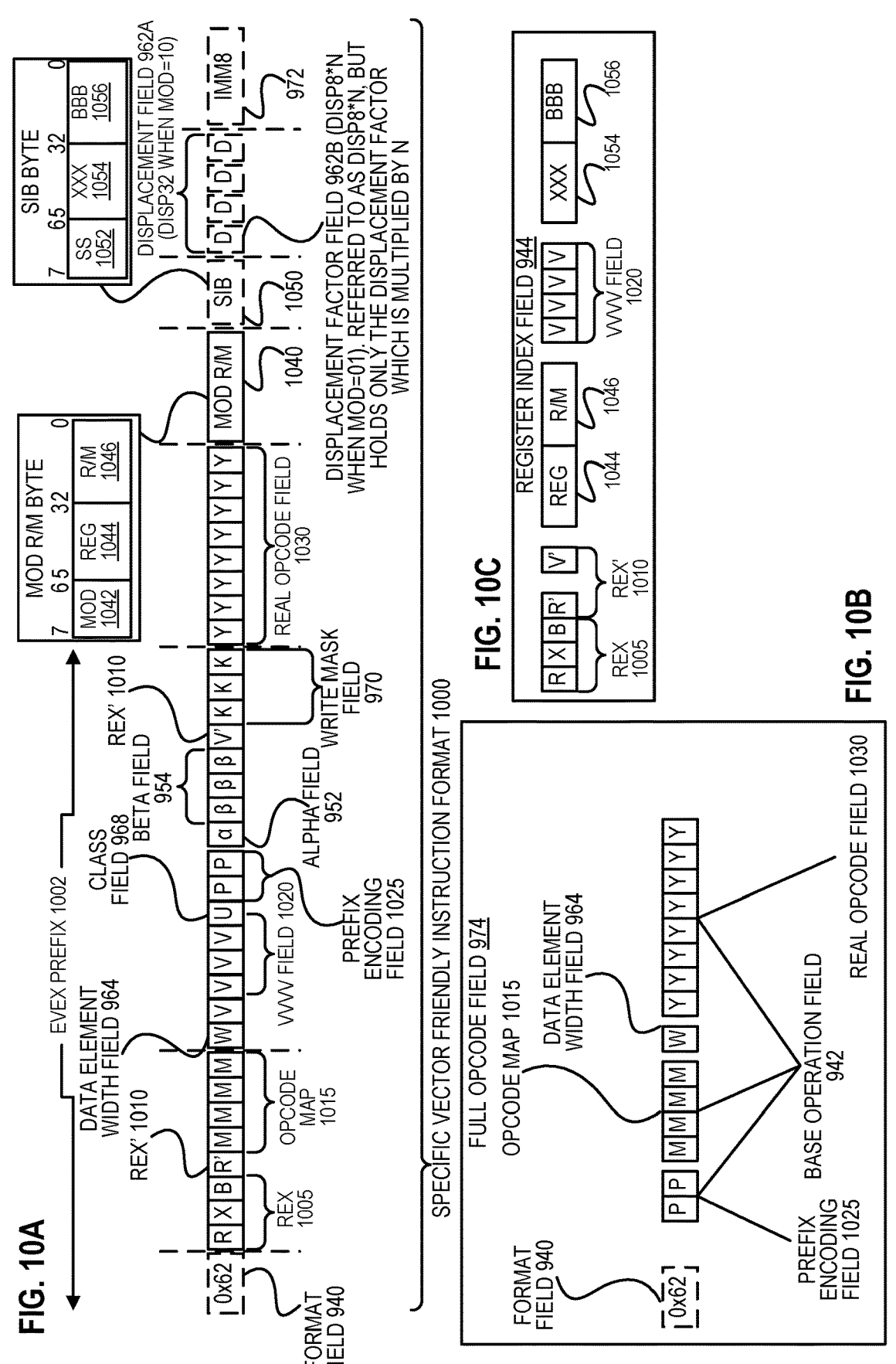
FIG. 10A is a block diagram illustrating fields for the generic vector friendly instruction formats in FIGS. 9A and 9B according to examples of the disclosure.
FIG. 10B is a block diagram illustrating the fields of the specific vector friendly instruction format in FIG. 10A that make up a full opcode field according to one example of the disclosure.
FIG. 10C is a block diagram illustrating the fields of the specific vector friendly instruction format in FIG. 10A that make up a register index field according to one example of the disclosure.

FIG. 10B is a block diagram illustrating the fields of the specific vector friendly instruction format 1000 that make up the full opcode field 974 according to one example of the disclosure. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one example of the disclosure. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
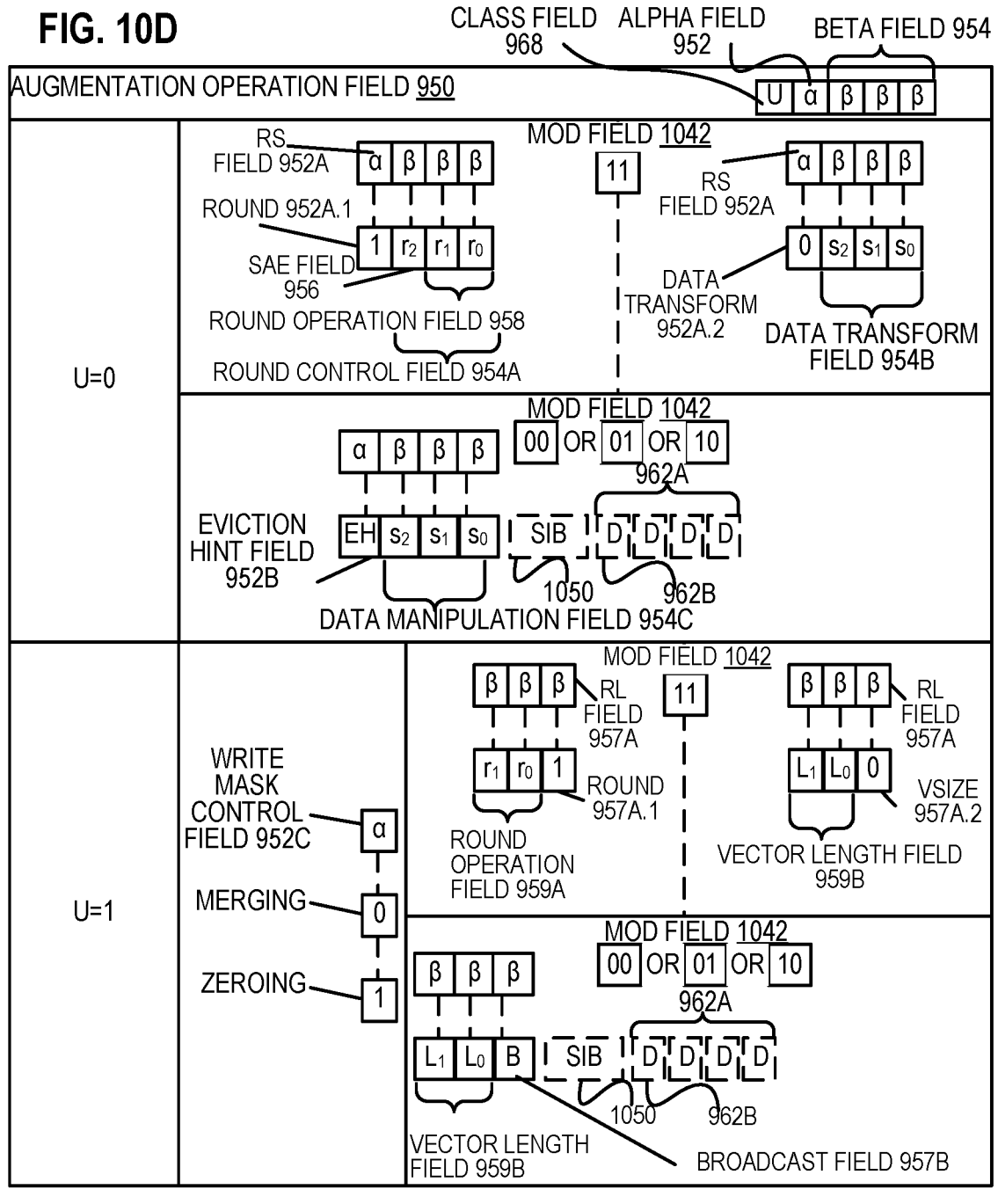
FIG. 10D is a block diagram illustrating the fields of the specific vector friendly instruction format in FIG. 10A that make up the augmentation operation field 950 according to one example of the disclosure.

FIG. 10D is a block diagram illustrating the fields of the specific vector friendly instruction format 1000 that make up the augmentation operation field 950 according to one example of the disclosure. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]-EH) is interpreted as the rs field 952A. When the rs field 952A contains a 1 (round 952A.1), the beta field 954 (EVEX byte 3, bits [6:4]-SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]-SSS) is interpreted as a three bit data transform field 954B. When U=0 and the MOD field 1042 contains 00, 01, or 10 (signifying a memory access operation), the alpha field 952 (EVEX byte 3, bit [7]-EH) is interpreted as the eviction hint (EH) field 952B and the beta field 954 (EVEX byte 3, bits [6:4]-SSS) is interpreted as a three bit data manipulation field 954C.

When U=1, the alpha field 952 (EVEX byte 3, bit [7]-EH) is interpreted as the write mask control (Z) field 952C. When U=1 and the MOD field 1042 contains 11 (signifying a no memory access operation), part of the beta field 954 (EVEX byte 3, bit [4]-$S_0$) is interpreted as the RL field 957A; when it contains a 1 (round 957A.1) the rest of the beta field 954 (EVEX byte 3, bit [6-5]-$S_{2-1}$) is interpreted as the round operation field 959A, while when the RL field 957A contains a 0 (VSIZE 957.A2) the rest of the beta field 954 (EVEX byte 3, bit [6-5]-$S_{2-1}$) is interpreted as the vector length field 959B (EVEX byte 3, bit [6-5]-$L_{1-0}$). When U=1 and the MOD field 1042 contains 00, 01, or 10 (signifying a memory access operation), the beta field 954 (EVEX byte 3, bits [6:4]-SSS) is interpreted as the vector length field 959B (EVEX byte 3, bit [6-5]-$L_{1-0}$) and the broadcast field 957B (EVEX byte 3, bit [4]-B).

Exemplary Register Architecture

Figure 11:
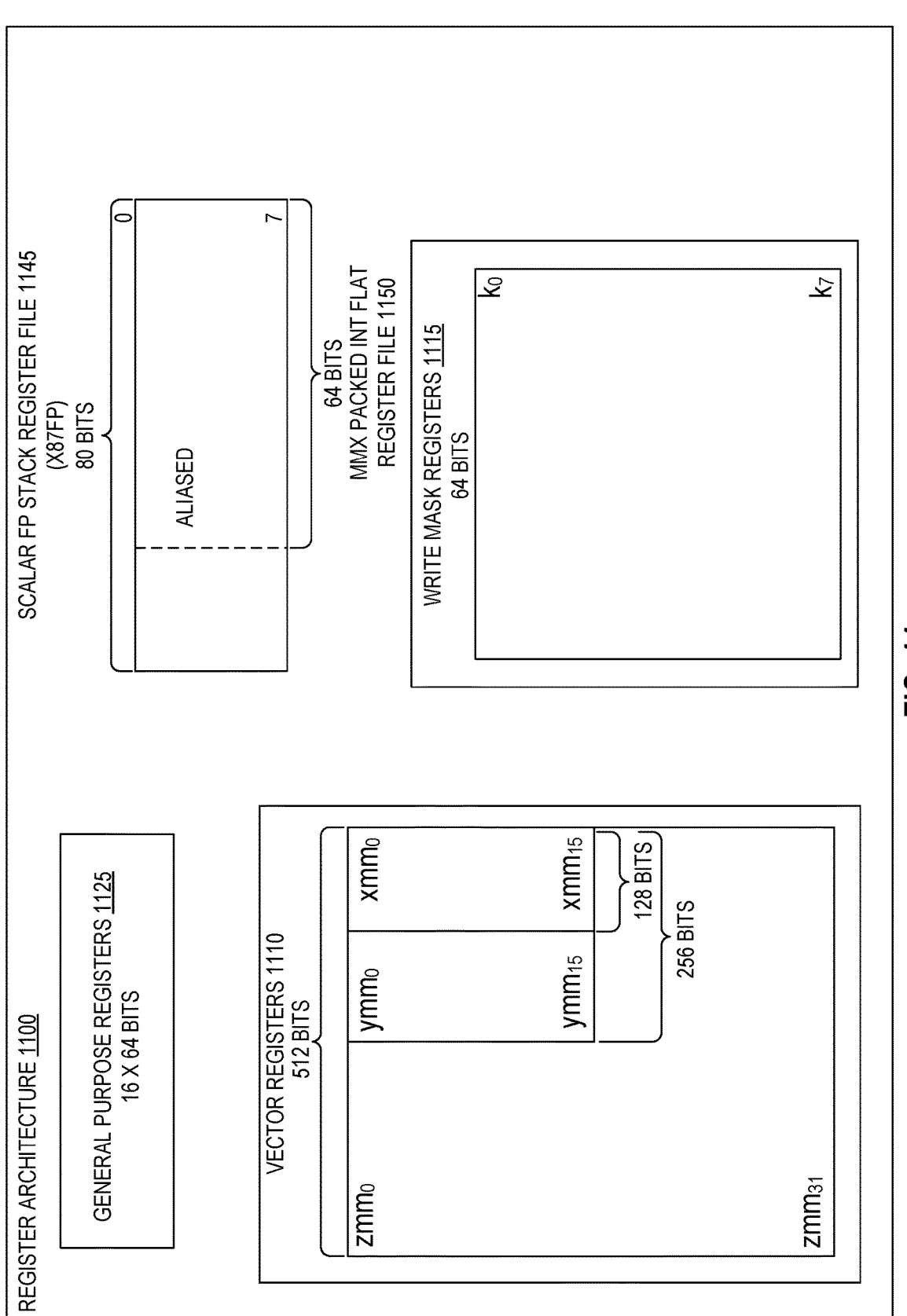
FIG. 11 is a block diagram of a register architecture according to one example of the disclosure

FIG. 11 is a block diagram of a register architecture 1100 according to one example of the disclosure. In the example illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one example, the class B instruction templates of the specific vector friendly instruction format 1000 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1115—in the example illustrated, there are 8 write mask registers (k0 through k7), each 64 bits in size. In an alternate example, the write mask registers 1115 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers.

Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 12A, 12B:
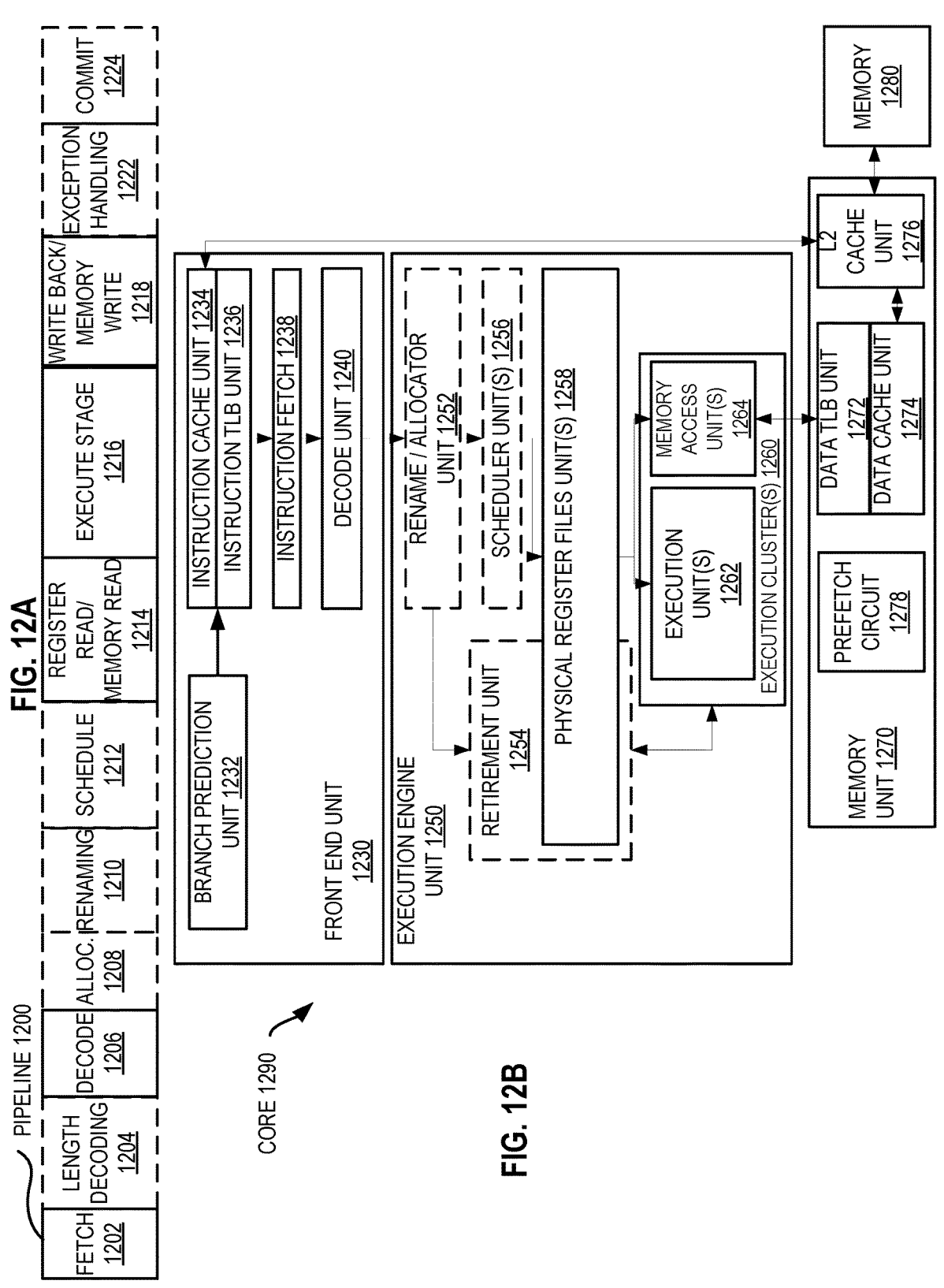
FIG. 12A is a block diagram illustrating both an exemplary in-order pipeline and an exemplary register renaming, out-of-order issue/execution pipeline according to examples of the disclosure.
FIG. 12B is a block diagram illustrating both an exemplary example of an in-order architecture core and an exemplary register renaming, out-of-order issue/execution architecture core to be included in a processor according to examples of the disclosure.

FIG. 12A is a block diagram illustrating both an exemplary in-order pipeline and an exemplary register renaming, out-of-order issue/execution pipeline according to examples of the disclosure. FIG. 12B is a block diagram illustrating both an exemplary example of an in-order architecture core and an exemplary register renaming, out-of-order issue/execution architecture core to be included in a processor according to examples of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one example, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit(s) 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1256, physical register file(s) unit(s) 1258, and execution cluster(s) 1260 are shown as being possibly plural because certain examples create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain examples are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary example, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

In certain examples, a prefetch circuit 1278 is included to prefetch data, for example, to predict access addresses and bring the data for those addresses into a cache or caches (e.g., from memory 1280).

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit

1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 1234/1274 and a shared L2 cache unit 1276, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary in-Order Core Architecture

Figure 13B:
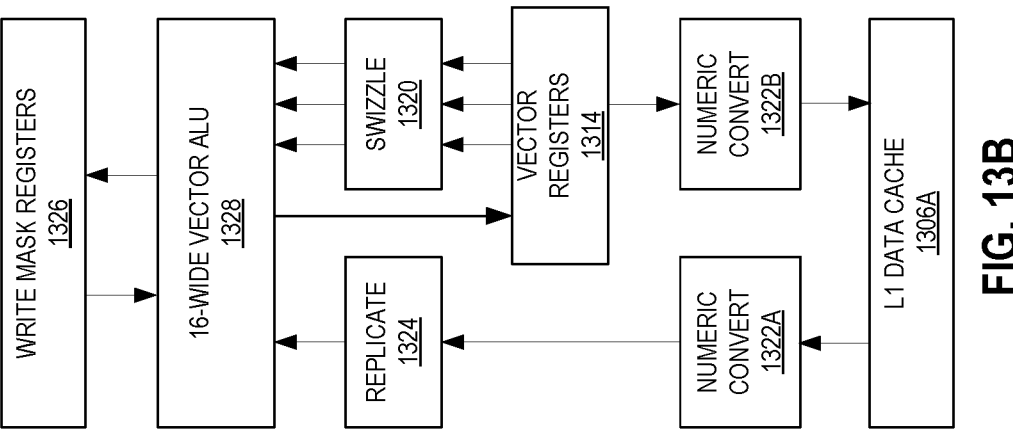
FIG. 13B is an expanded view of part of the processor core in FIG. 13A according to examples of the disclosure.
Figure 13A:
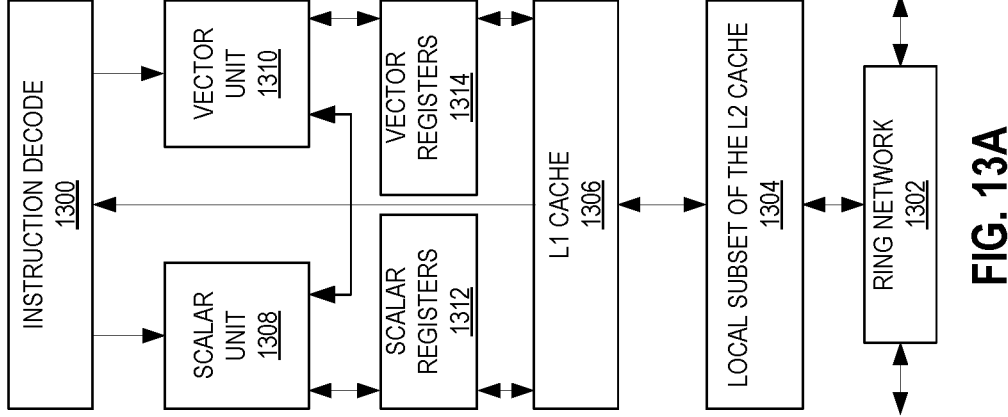
FIG. 13A is a block diagram of a single processor core, along with its connection to the on-die interconnect network and with its local subset of the Level 2 (L2) cache, according to examples of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to examples of the disclosure. In one example, an instruction decode unit 1300 supports the x86 instruction set with a packed data instruction set extension. An L1 cache 1306 allows low-latency accesses to cache memory into the scalar and vector units. While in one example (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative examples of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to examples of the disclosure. FIG. 13B includes an L1 data cache 1306A part of the L1 cache 1306, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
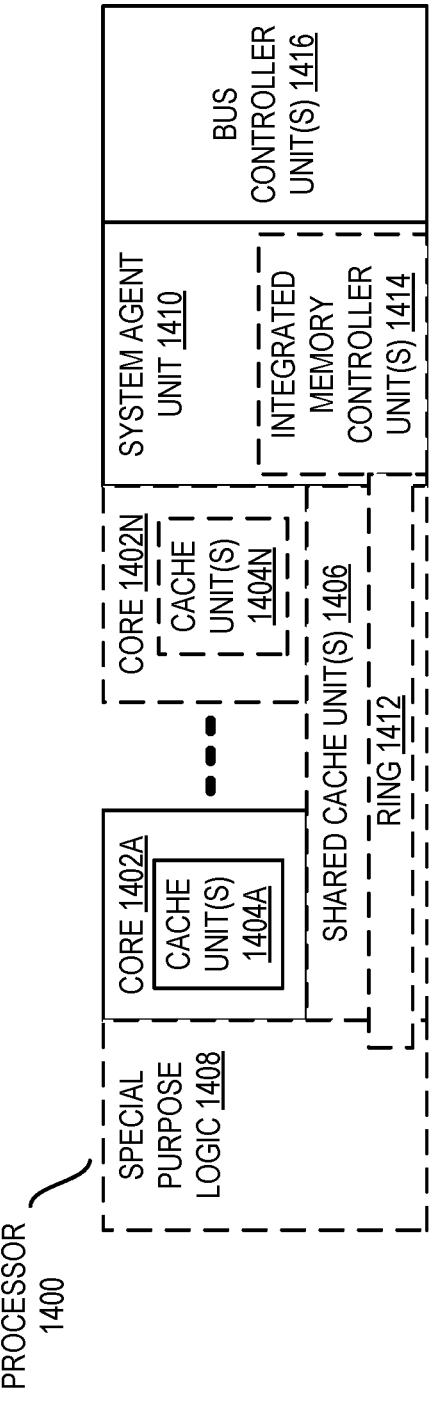
FIG. 14 is a block diagram of a processor that may have more than one core, may have an integrated memory controller, and may have integrated graphics according to examples of the disclosure.

FIG. 14 is a block diagram of a processor 1400 that may have more than one core, may have an integrated memory controller, and may have integrated graphics according to examples of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one example a ring based interconnect unit 1412 interconnects the integrated graphics logic 1408, the set of shared cache units 1406, and the system agent unit 1410/integrated memory controller unit(s) 1414, alternative examples may use any number of well-known techniques for interconnecting such units. In one example, coherency is maintained between one or more cache units 1406 and cores 1402-A-N.

In some examples, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
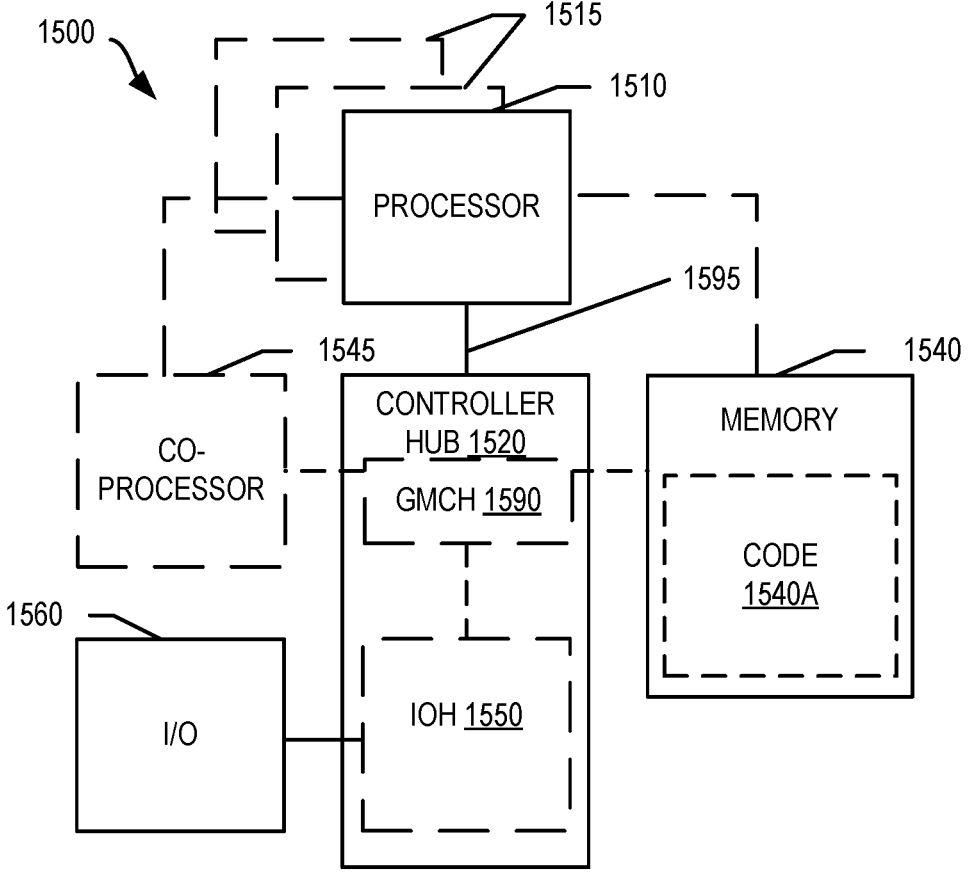
FIG. 15 is a block diagram of a system in accordance with one example of the present disclosure.

Referring now to FIG. 15, shown is a block diagram of a system 1500 in accordance with one example of the present disclosure. The system 1500 may include one or more processors 1510, 1515, which are coupled to a controller hub 1520. In one example the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include code 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one example, the controller hub 1520 communicates with the processor(s) 1510, 1515 via a multi-drop bus, such as a frontside bus (FSB), point-to-point interface such as Quickpath Interconnect (QPI), or similar connection 1595.

In one example, the coprocessor 1545 is a special-purpose processor, such as, for example, a high-throughput MIC processor, a network or communication processor, compression engine, graphics processor, GPGPU, embedded processor, or the like. In one example, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one example, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
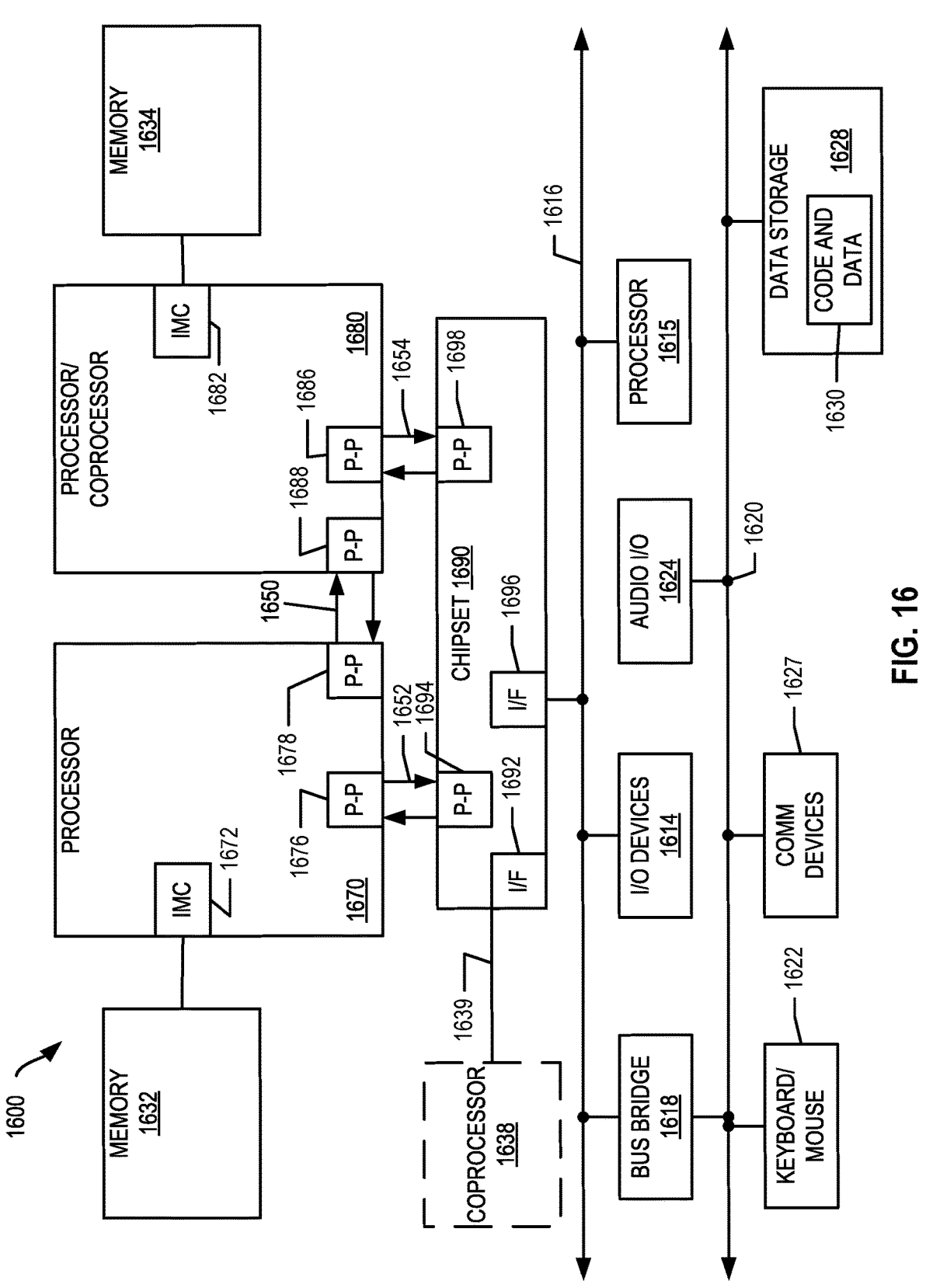
FIG. 16 is a block diagram of a more specific exemplary system in accordance with an example of the present disclosure.

Referring now to FIG. 16, shown is a block diagram of a first more specific exemplary system 1600 in accordance with an example of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one example of the disclosure, processors 1670 and 1680 are respectively processors 1510 and 1515, while coprocessor 1638 is coprocessor 1545. In another example, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one example, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one example, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one example, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one example, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one example. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
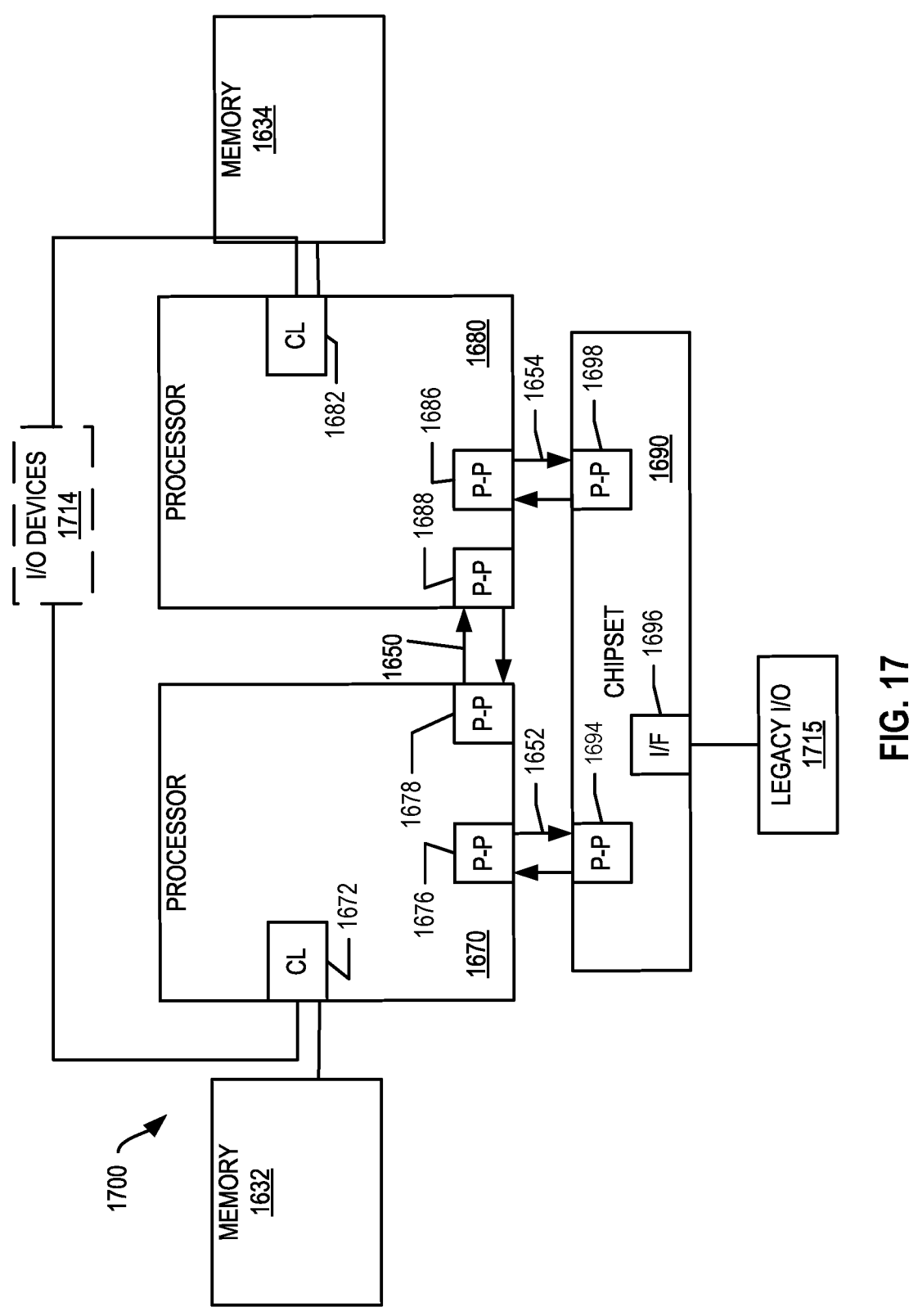
FIG. 17 is a block diagram of a second more specific exemplary system in accordance with an example of the present disclosure.

Referring now to FIG. 17, shown is a block diagram of a second more specific exemplary system 1700 in accordance with an example of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
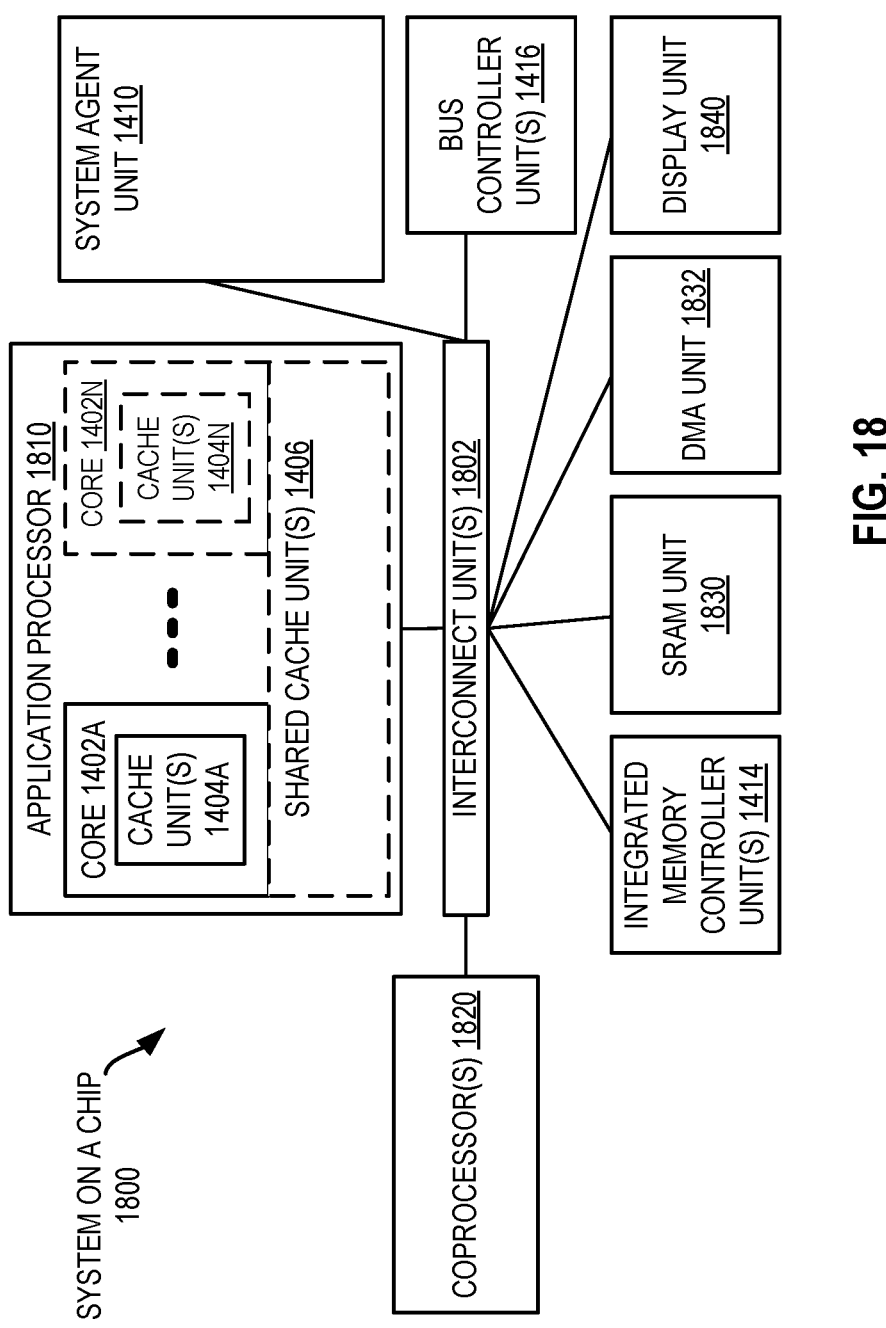
FIG. 18 is a block diagram of a system on a chip (SoC) in accordance with an example of the present disclosure.

Referring now to FIG. 18, shown is a block diagram of a SoC 1800 in accordance with an example of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; a static random access memory (SRAM) unit 1830; a direct memory access (DMA) unit 1832; and a display unit 1840 for coupling to one or more external displays. In one example, the coprocessor(s) 1820 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
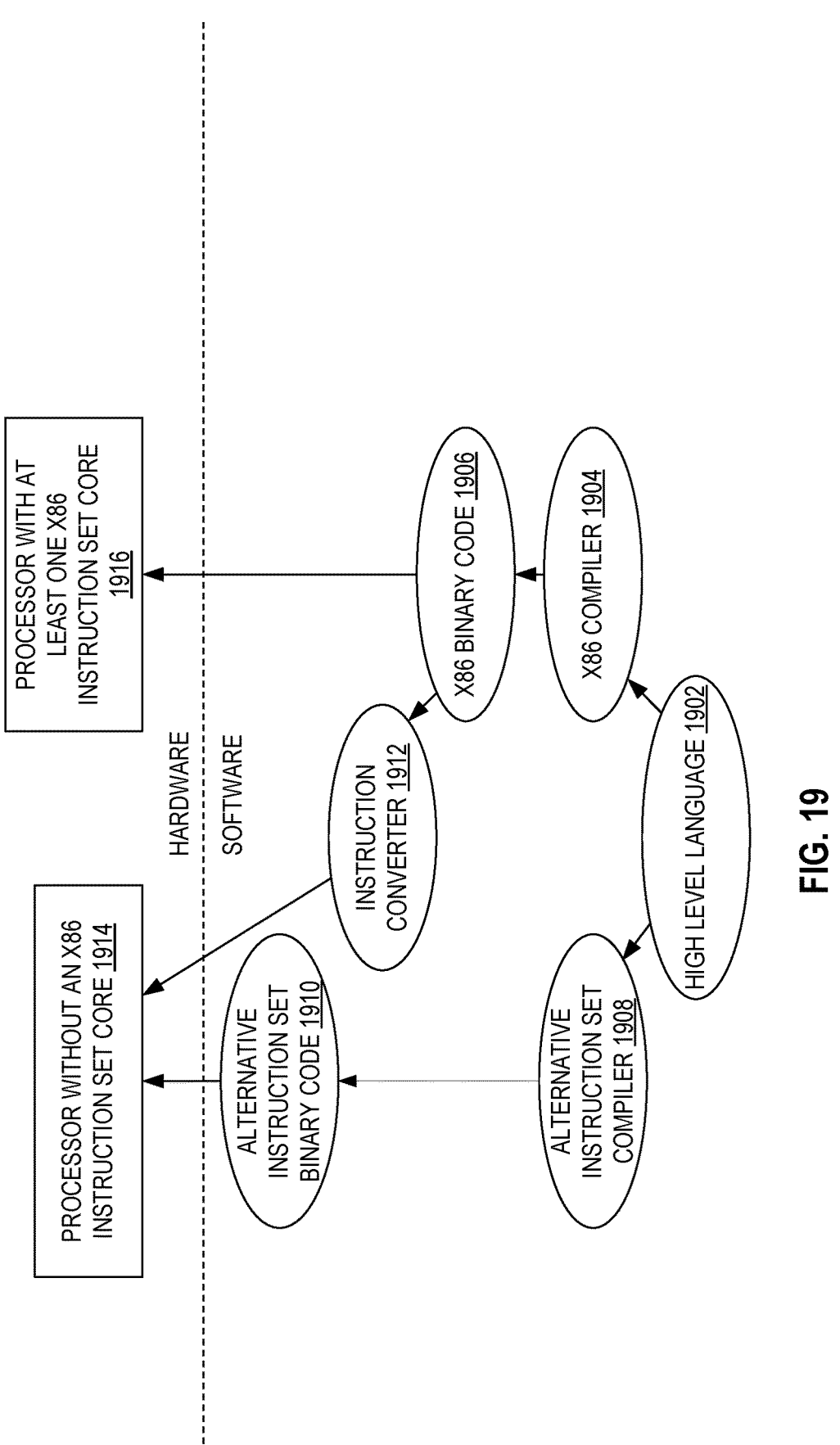
FIG. 19 is a block diagram contrasting the use of a software instruction converter to convert binary instructions in a source instruction set to binary instructions in a target instruction set according to examples of the disclosure.

FIG. 19 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation, or any other process, allows a processor or other electronic device that does not have an x86 instruction set processor or core to execute the x86 binary code 1906.

What is claimed is:

1. An apparatus comprising:
an execution circuit to generate a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed; and
a capability management circuit to:
determine a first location of a corresponding first metadata field in the memory based on the bounds field of the first capability,
proceed with the first memory access request in response to a match of metadata in the single metadata field of the first capability against metadata at the corresponding first metadata field in the memory,
determine a second location of a corresponding second metadata field in the memory based on the bounds field of the second capability, and
proceed with the second memory access request in response to a match of metadata in the single metadata field of the second capability against metadata at the corresponding second metadata field in the memory.

2. The apparatus of claim 1, wherein the capability management circuit is to generate an exception in response to there not being the match for the first memory access request or the second memory access request.

3. The apparatus of claim 1, wherein the first single object in the memory is a plurality of lines of the memory and the second different sized single object in the memory is more lines than the plurality of lines.

4. The apparatus of claim 1, wherein:

the single metadata field of the first capability identifies a first tag to be used by the capability management circuit to unlock access to the first single object in the memory, and the single metadata field of the second capability identifies a second tag to be used by the capability management circuit to unlock access to the second different sized single object in the memory.

5. The apparatus of claim 1, wherein:

the bounds field of the first capability identifies a first bitmap, that indicates which portion of the first single object contains pointers that are to be protected from corruption, to be used by the capability management circuit to unlock access to the first single object in the memory, and the bounds field of the second capability identifies a second bitmap, that indicates which portion of the second different sized single object contains pointers that are to be protected from corruption, to be used by the capability management circuit to unlock access to the second different sized single object in the memory.

6. The apparatus of claim 1, wherein:

the single metadata field of the first capability identifies a first key to be used by the capability management circuit to decrypt and unlock access to the first single object in the memory, and the single metadata field of the second capability identifies a second key to be used by the capability management circuit to decrypt and unlock access to the second different sized single object in the memory.

7. The apparatus of claim 1, wherein:

the single metadata field of the first capability identifies a first object type to be used by the capability management circuit to unlock access to the first single object in the memory, and the single metadata field of the second capability identifies a second object type to be used by the capability management circuit to unlock access to the second different sized single object in the memory.

8. The apparatus of claim 1, further comprising a decoder circuit to decode a single instruction into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and the execution circuit is to execute the decoded single instruction according to its opcode.

9. A method comprising:

generating, by an execution circuit of a processor, a first memory access request for a first single object in memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed;

determining, by a capability management circuit of the processor, a first location of a corresponding first metadata field in the memory based on the bounds field of the first capability;

proceeding, by the capability management circuit of the processor, with the first memory access request in response to a match of metadata in the single metadata field of the first capability against metadata at the corresponding first metadata field in the memory;

determining, by the capability management circuit of the processor, a second location of a corresponding second metadata field in the memory based on the bounds field of the second capability; and proceeding, by the capability management circuit of the processor, with the second memory access request in response to a match of metadata in the single metadata field of the second capability against metadata at the corresponding second metadata field in the memory.

10. The method of claim 9, further comprising generating, by the capability management circuit of the processor, an exception in response to there not being the match for the first memory access request or the second memory access request.

11. The method of claim 9, wherein the first single object in the memory is a plurality of lines of the memory and the second different sized single object in the memory is more lines than the plurality of lines.

12. The method of claim 9, wherein:

the single metadata field of the first capability identifies a first tag to be used by the capability management circuit to unlock access to the first single object in the memory, and the single metadata field of the second capability identifies a second tag to be used by the capability management circuit to unlock access to the second different sized single object in the memory.

13. The method of claim 9, wherein:

the bounds field of the first capability identifies a first bitmap, that indicates which portion of the first single object contains pointers that are to be protected from corruption, to be used by the capability management circuit to unlock access to the first single object in the memory, and the bounds field of the second capability identifies a second bitmap, that indicates which portion of the second different sized single object contains pointers that are to be protected from corruption, to be used by the capability management circuit to unlock access to the second different sized single object in the memory.

14. The method of claim 9, wherein:

the single metadata field of the first capability identifies a first key to be used by the capability management circuit to decrypt and unlock access to the first single object in the memory, and the single metadata field of the second capability identifies a second key to be used by the capability management circuit to decrypt and unlock access to the second different sized single object in the memory.

15. The method of claim 9, wherein:

the single metadata field of the first capability identifies a first object type to be used by the capability management circuit to unlock access to the first single object in the memory, and the single metadata field of the second capability identifies a second object type to be used by the capability management circuit to unlock access to the second different sized single object in the memory.

16. The method of claim 9, further comprising:

decoding a single instruction, by a decoder circuit of the processor, into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and executing, by the execution circuit, the decoded single instruction according to its opcode.

17. A system comprising:

a memory; and a processor coupled to the memory, the processor comprising:

an execution circuit to generate a first memory access request for a first single object in the memory by a first capability and a second memory access request for a second different sized single object in the memory by a second capability, wherein a format of each of the first capability and the second capability comprises a single metadata field for access control of a single object in the memory, a bounds field that is to indicate a lower bound and an upper bound of the single object in the memory to which the single metadata field authorizes access, and an address field to indicate an address in the single object that is to be accessed, and a capability management circuit to:

determine a first location of a corresponding first metadata field in the memory based on the bounds field of the first capability, proceed with the first memory access request in response to a match of metadata in the single metadata field of the first capability against metadata at the corresponding first metadata field in the memory, determine a second location of a corresponding second metadata field in the memory based on the bounds field of the second capability, and proceed with the second memory access request in response to a match of metadata in the single metadata field of the second capability against metadata at the corresponding second metadata field in the memory.

18. The system of claim 17, wherein the capability management circuit is to generate an exception in response to there not being the match for the first memory access request or the second memory access request.

19. The system of claim 17, wherein the first single object in the memory is a plurality of lines of the memory and the second different sized single object in the memory is more lines than the plurality of lines.

20. The system of claim 17, wherein:

the single metadata field of the first capability identifies a first tag to be used by the capability management circuit to unlock access to the first single object in the memory, and the single metadata field of the second capability identifies a second tag to be used by the capability management circuit to unlock access to the second different sized single object in the memory.

21. The system of claim 17, wherein:

the bounds field of the first capability identifies a first bitmap, that indicates which portion of the first single object contains pointers that are to be protected from corruption, to be used by the capability management circuit to unlock access to the first single object in the memory, and the bounds field of the second capability identifies a second bitmap, that indicates which portion of the second different sized single object contains pointers that are to be protected from corruption, to be used by the capability management circuit to unlock access to the second different sized single object in the memory.

22. The system of claim 17, wherein:

the single metadata field of the first capability identifies a first key to be used by the capability management circuit to decrypt and unlock access to the first single object in the memory, and the single metadata field of the second capability identifies a second key to be used by the capability management circuit to decrypt and unlock access to the second different sized single object in the memory.

23. The system of claim 17, wherein:

the single metadata field of the first capability identifies a first object type to be used by the capability management circuit to unlock access to the first single object in the memory, and the single metadata field of the second capability identifies a second object type to be used by the capability management circuit to unlock access to the second different sized single object in the memory.

24. The system of claim 17, wherein the processor further comprises a decoder circuit to decode a single instruction into a decoded single instruction, the single instruction comprising fields to indicate a source register storing the first capability, an update for the metadata of the first capability, and an opcode to indicate that the execution circuit is to determine the first location of the corresponding first metadata field in the memory based on the bounds field of the first capability in the source register, and store the update for the metadata at the first location of the corresponding first metadata field; and the execution circuit is to execute the decoded single instruction according to its opcode.

\* \* \* \* \*